(12) United States Patent
Bova et al.

(10) Patent No.: US 10,039,266 B2
(45) Date of Patent: Aug. 7, 2018

(54) RETRACTABLE PET LEASH AND METHOD OF ASSEMBLING SAME

(71) Applicant: Quincy's Crossing, LLC, Chesterfield, MO (US)

(72) Inventors: JoAnn R. Bova, Chesterfield, MO (US); Sandra D. Knepp, Chesterfield, MO (US)

( * ) Notice: Subject to any disclaimer, the term of this patent is extended or adjusted under 35 U.S.C. 154(b) by 312 days.

(21) Appl. No.: 15/074,824

(22) Filed: Mar. 18, 2016

(65) Prior Publication Data

US 2016/0270373 A1 Sep. 22, 2016

Related U.S. Application Data

(60) Provisional application No. 62/135,126, filed on Mar. 18, 2015.

(51) Int. Cl.
*A01K 27/00* (2006.01)

(52) U.S. Cl.
CPC .......... *A01K 27/004* (2013.01); *A01K 27/005* (2013.01)

(58) Field of Classification Search
CPC ... A01K 27/004; A01K 27/001; A01K 27/008
USPC ........ 119/794, 796, 770, 780, 781, 793, 791
See application file for complete search history.

(56) References Cited

U.S. PATENT DOCUMENTS

| | | | |
|---|---|---|---|
| 2,889,807 A | 6/1959 | Beebe | |
| 3,693,596 A | 9/1972 | Bayer et al. | |
| 3,776,198 A * | 12/1973 | Gehrke | A01K 27/004 119/794 |
| 3,853,283 A | 12/1974 | Bayer et al. | |
| 4,018,189 A | 4/1977 | Umphries et al. | |
| 4,165,713 A * | 8/1979 | Brawner | A01K 27/004 119/794 |
| 4,197,817 A | 4/1980 | Grutchfield | |
| 4,269,150 A | 5/1981 | McCarthy | |
| 4,964,370 A | 10/1990 | Peterson | |
| 4,977,860 A * | 12/1990 | Harwell | A01K 27/004 119/794 |
| 5,638,772 A * | 6/1997 | Kaufmann | A01K 27/005 119/770 |
| D392,429 S | 3/1998 | Plewa et al. | |
| 5,816,198 A | 10/1998 | Peterson | |
| 5,890,456 A | 4/1999 | Tancrede | |
| 5,947,062 A | 9/1999 | Hoffman et al. | |
| 5,950,569 A | 9/1999 | Perrulli | |
| 6,095,093 A | 8/2000 | Kisko et al. | |
| 6,148,773 A | 11/2000 | Bogdahn | |
| D439,302 S | 3/2001 | Plewa | |
| 6,405,683 B1 | 6/2002 | Walter et al. | |
| 6,526,918 B1 | 3/2003 | Arnold | |
| 6,694,922 B2 | 2/2004 | Walter et al. | |
| 6,712,026 B1 | 3/2004 | Carville, Jr. | |
| 6,886,499 B2 | 5/2005 | Meissner | |

(Continued)

*Primary Examiner* — Yvonne R Abbott-Lewis
(74) *Attorney, Agent, or Firm* — Charles McCloskey

(57) ABSTRACT

A retractable pet leash. The leash includes a grip configured for releasably attaching to a user and a flexible tether connected to the grip. The leash also has a retractor assembly including a housing having an internal chamber sized and shaped for receiving a spool for receiving the tether when retracted into the housing and a fastener rotatably attached to the housing. The fastener is adapted to attach the housing to a pet garment so the housing rotates with respect to the fastener.

20 Claims, 46 Drawing Sheets

(56) References Cited

U.S. PATENT DOCUMENTS

| | | | |
|---|---|---|---|
| 6,904,872 B2 | 6/2005 | Müller | |
| 7,036,459 B1 | 5/2006 | Mugford et al. | |
| 7,150,247 B2 * | 12/2006 | Eulette | A01K 27/004 |
| | | | 119/798 |
| 7,162,978 B2 | 1/2007 | DeBien | |
| 7,168,393 B2 | 1/2007 | Bogdahn et al. | |
| 7,610,880 B2 * | 11/2009 | Lord | A01K 27/001 |
| | | | 119/794 |
| D676,618 S | 2/2013 | Kalbach | |
| 8,695,537 B2 * | 4/2014 | Bizzell | A01K 27/004 |
| | | | 119/794 |
| 8,701,601 B2 * | 4/2014 | Hunt | A47D 13/086 |
| | | | 119/770 |
| 8,826,864 B2 * | 9/2014 | Tang | A01K 27/004 |
| | | | 119/795 |
| 8,919,293 B2 * | 12/2014 | Cromwell | A01K 27/001 |
| | | | 119/794 |
| 8,935,993 B2 * | 1/2015 | Fox | A01K 27/008 |
| | | | 119/796 |
| 9,016,242 B2 * | 4/2015 | Bentz | A01K 27/004 |
| | | | 119/796 |
| 2006/0219182 A1 | 10/2006 | Rabello | |
| 2006/0236956 A1 * | 10/2006 | Lord | A01K 27/004 |
| | | | 119/794 |
| 2008/0173257 A1 | 7/2008 | Steiner et al. | |
| 2008/0257278 A1 * | 10/2008 | Simpson | A01K 1/04 |
| | | | 119/781 |

* cited by examiner

FIG. 3
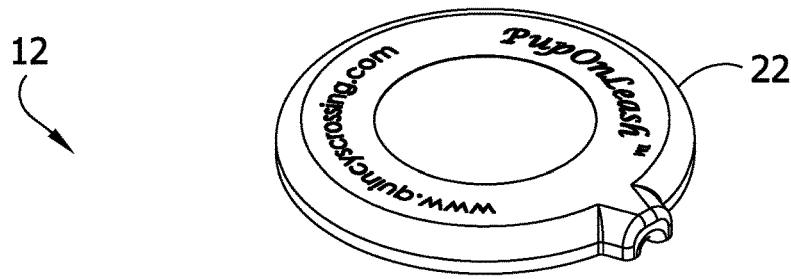
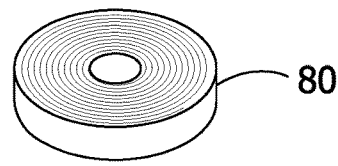
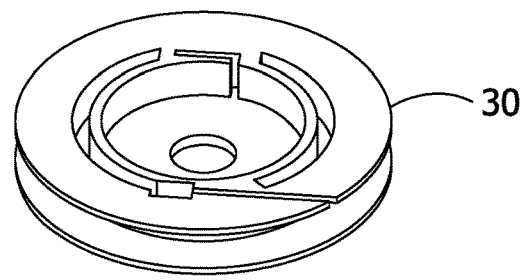
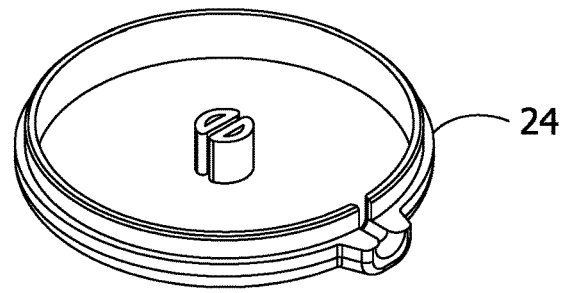
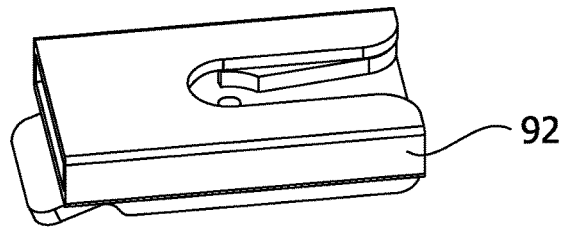

RETRACTABLE PET LEASH AND METHOD OF ASSEMBLING SAME

CROSS REFERENCE TO RELATED APPLICATION

This Application claims priority to U.S. Patent Application 62/135,126, filed Mar. 18, 2015, and entitled, "Retractable Pet Leash and Method of Assembling Same," which is hereby incorporated by reference in its entirety.

BACKGROUND OF THE INVENTION

The present disclosure relates generally to pet leashes and more specifically to retractable pet leashes that are carried by a pet.

Retractable pet leashes enable pet owners to tether their animals at different distances using a single apparatus. Conventionally, retractable leashes include a retractor assembly that is held by the pet owner. A selectively extendable tether extends away from the retractor assembly and its free end is secured to a pet. Some retractable leashes include a retractor assembly that is carried by the pet rather than the user. A handhold connected to a tether is selectively extendable away from the retractor assembly carried by the pet. Typically, pet carried retractable leashes are secured in a fixed orientation relative to the collar of the pet, and the tether extend away from the retractor assembly at a fixed angle. When the retractor assembly is secured to the pet collar, the tether extends from the retractor at angles that may cause drag on the tether and increase tension felt by the user and pet.

SUMMARY OF THE INVENTION

In one aspect, a retractable pet leash comprises a grip configured for releasably attaching to a user and a flexible tether connected to the grip. The leash also comprises a retractor assembly including a housing having an internal chamber sized and shaped for receiving a spool for receiving the tether when retracted into the housing and a fastener rotatably attached to the housing. The fastener is adapted to attach the housing to a pet garment so the housing rotates with respect to the fastener.

In another aspect, a leash comprises a grip having an opening sized for attaching to a user, a flexible tether connected to the grip, and a retractor assembly. The assembly includes a housing having an internal chamber sized and shaped for receiving a spool for receiving the tether when retracted into the housing and a fastener attached to the housing adapted for attaching the housing to a pet garment. The housing has a protrusion configured for engaging the opening in the grip to secure the grip to the housing in a stowed position.

In a further aspect, a leash comprises a grip configured for releasably attaching to a user, a flexible tether connected to the grip, and a retractor assembly. The assembly includes a housing having an internal chamber and a tether guide opening extending into the internal chamber of the housing. The tether guide opening is sized for slidably passing the tether through when the tether is retracted into the internal chamber of the housing through the tether guard opening. The leash also comprises a spool mounted in the internal chamber of the housing for rotation with respect to the housing about a central axis. The spool has opposite ends spaced along the central axis and a separator flange positioned between the opposite ends of the spool. A first portion of the spool between a first of the ends and the separator flange is aligned with the tether guide opening of the housing for windingly receiving the tether when retracted into the internal chamber of the housing. The leash also comprises a spring positioned in the internal chamber of the housing adapted to rotate the spool to wind the tether onto the first portion of the spool. The spring is connected to a second portion of the spool between a second of the ends and the separator flange so the separator flange separates the spring from the tether.

Other objects and features will be in part apparent and in part pointed out hereinafter.

BRIEF DESCRIPTION OF THE DRAWINGS

FIG. 3 is a separated perspective of the retractor assembly and clip of FIG. 2;

Corresponding reference characters indicate corresponding parts throughout the drawings.

DETAILED DESCRIPTION

Figure 1:
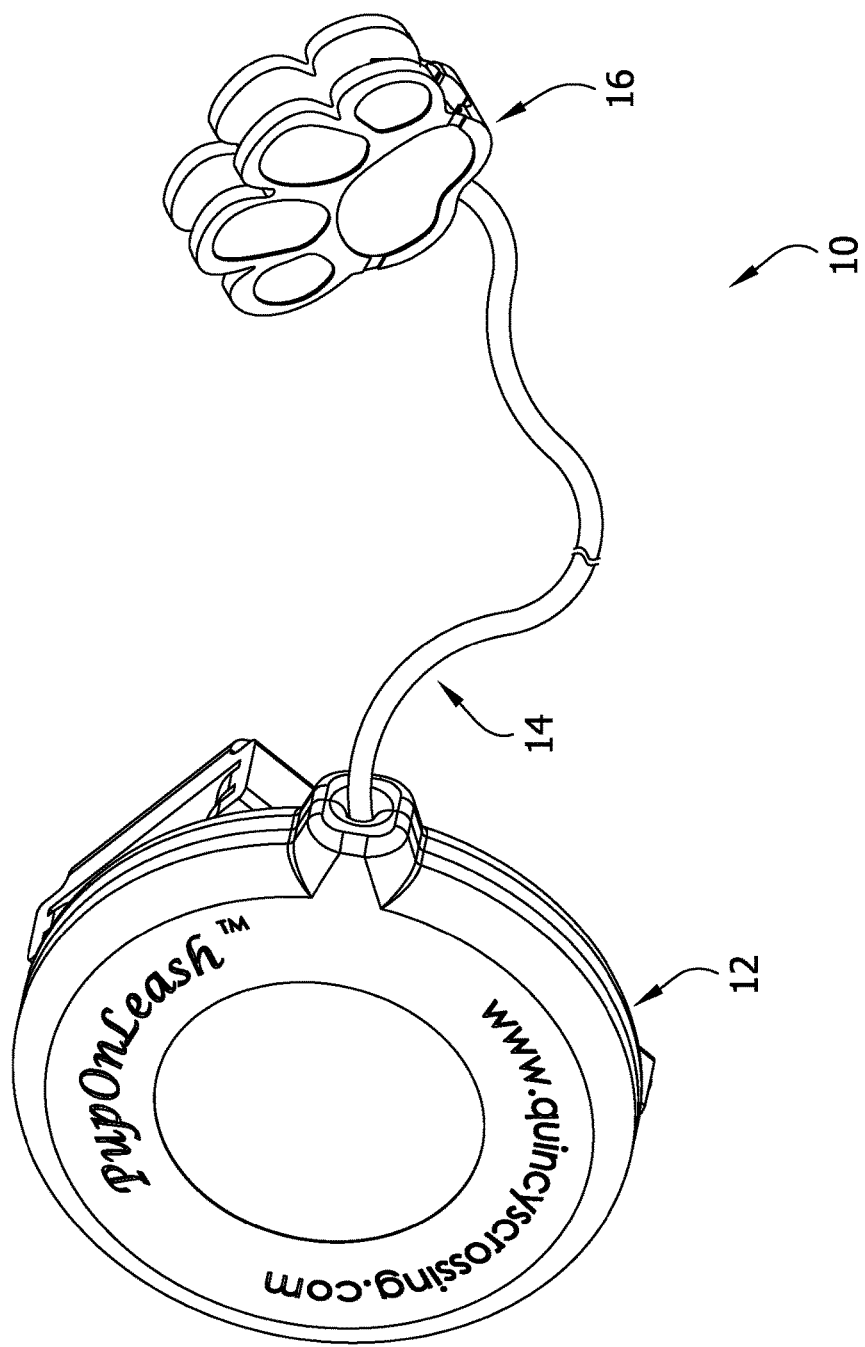
FIG. 1 is a perspective of a retractable pet leash of a first example.

Referring to FIG. 1, a first example of a retractable pet leash is indicated in its entirety by reference number 10. The leash 10 includes a retractor assembly 12 for automatically retracting a flexible tether or lead 14 when tension between the tether 14 and the retractor assembly is released. As discussed in greater detail below, the retractor assembly 12 is configured to be secured to the collar of a pet so the weight of the retractor assembly is supported by the pet. One end of the flexible tether 14 is secured to the retractor assembly 12, and the other end of the tether is secured to a connector 16 for selectively connecting interchangeable attachments such as a handhold or grip (not shown) to the tether.

Referring to FIGS. 2-12, the retractor assembly 12 includes a housing 20 made up of an upper housing member 22 and a lower housing member 24. Although the housing members 22, 24 may be formed differently, in example the members are separate plastic components manufactured by an injection molding process. The upper housing member 22 is configured to join with the lower housing member 24 in an operative arrangement in which the upper and lower housing arms collectively define an internal chamber 26 (FIG. 6) sized for receiving a tether spool 30. The upper housing member 22 can be fixed to the lower housing member 24 in several conventional ways (e.g., adhesives, screws, interference fit, detents, and other fasteners).

Figure 6:
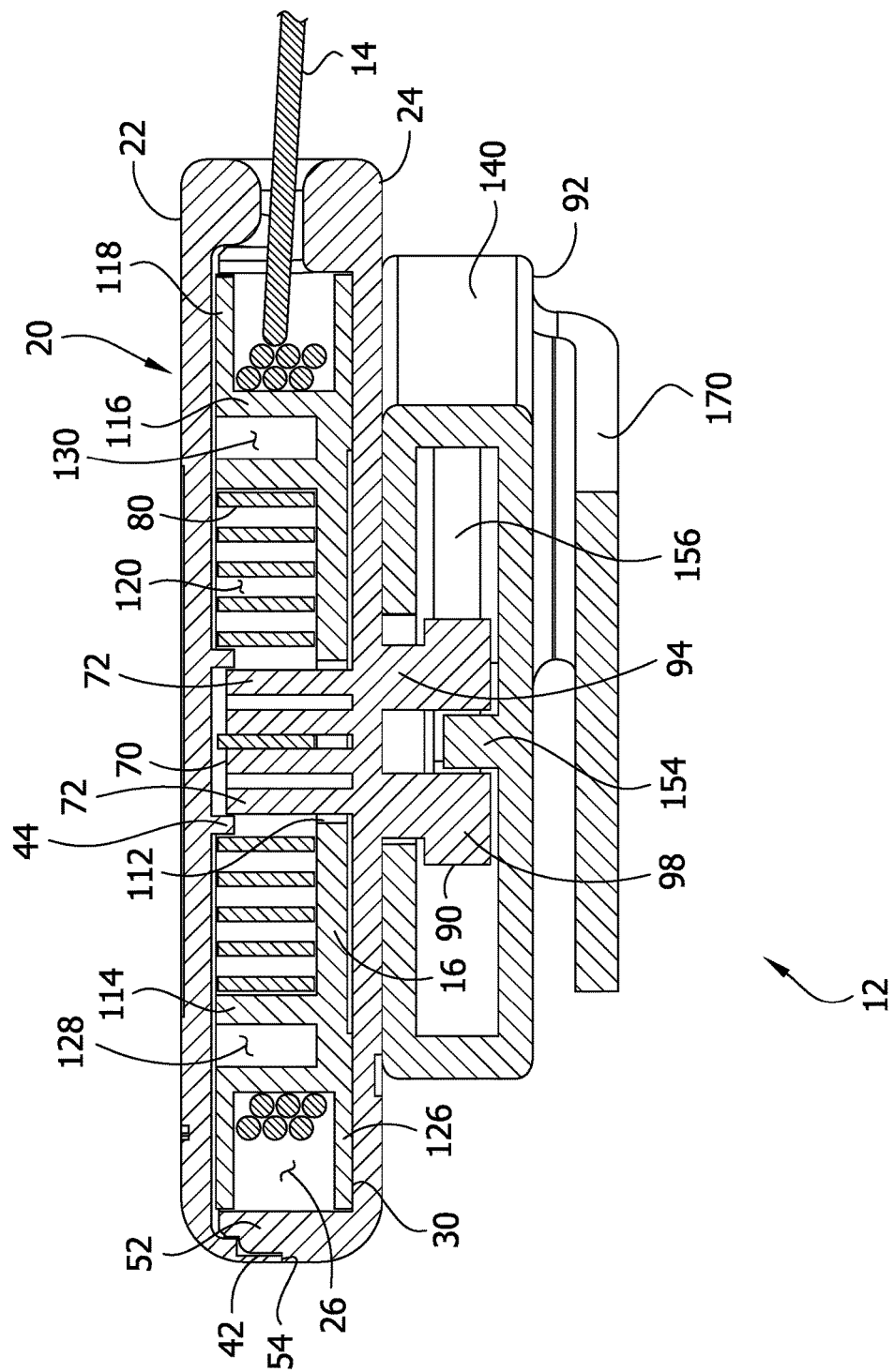
FIG. 6 is a section taken in the plane of line 6-6 of FIG. 4.
Figure 7:
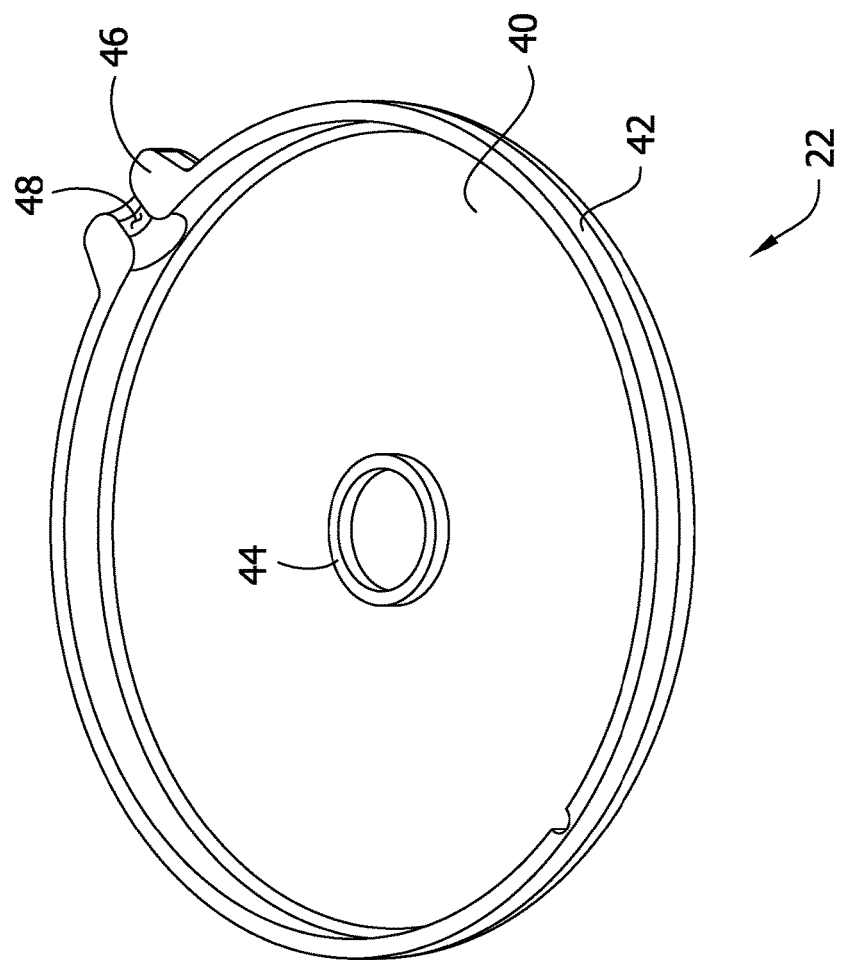
FIG. 7 is a perspective of an upper housing member of the retractor assembly of FIG. 2.

As shown in FIG. 7, the upper housing member 22 has a generally circular planar top 40 and a generally annular side 42 extending from a perimeter of the top. When the upper housing member 22 is joined to the lower housing member 24 as shown in FIG. 6, the top 40 and annular side 42 define an upper cavity of the internal chamber 26 of the housing 20.

Figure 2:
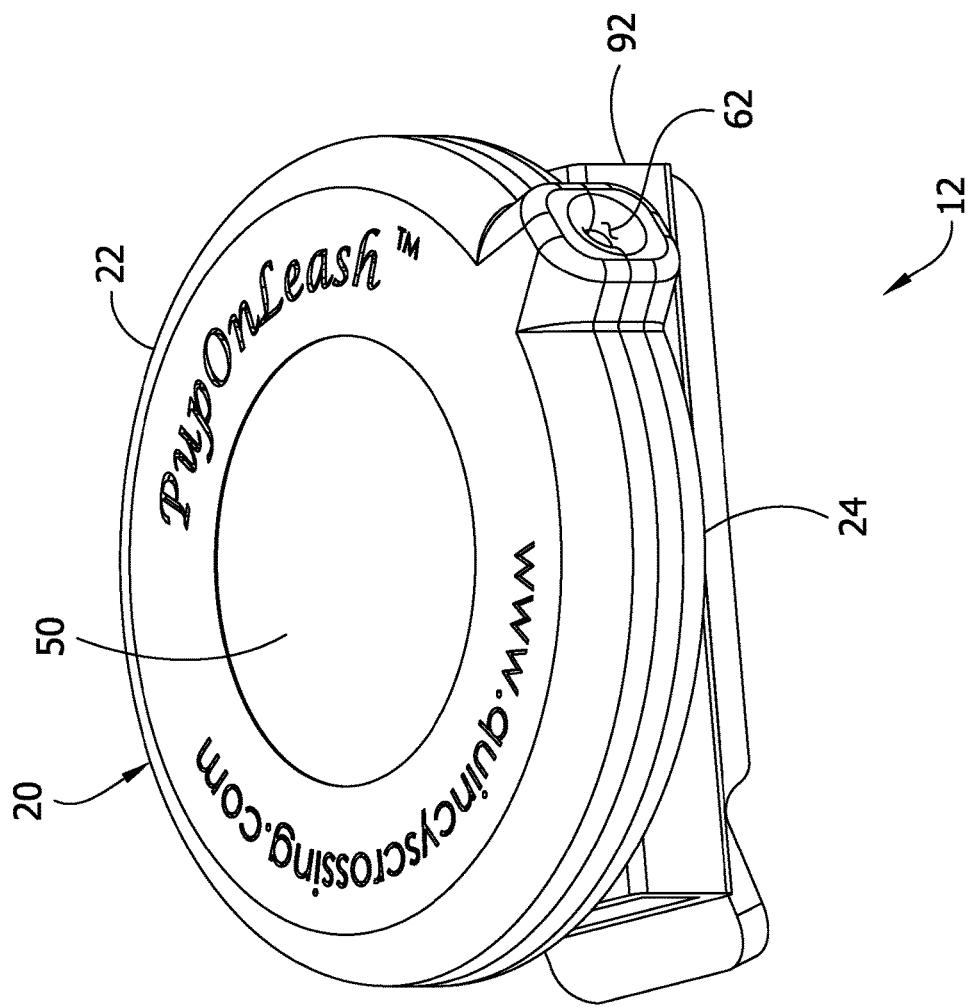
FIG. 2 is a perspective of a retractor assembly of the leash of FIG. 1 secured to a clip.
Figure 4:
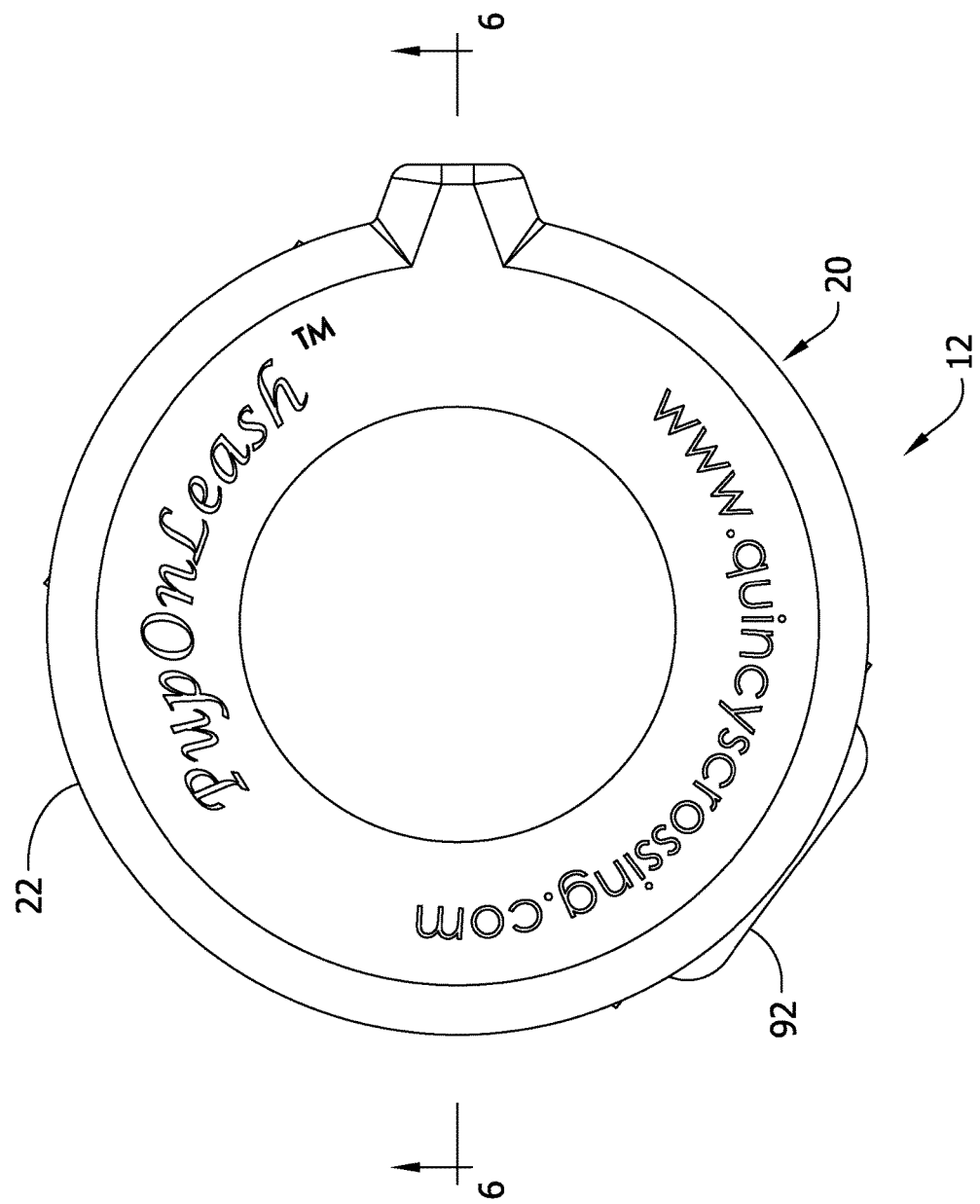
FIG. 4 is a top plan of the retractor assembly and clip of FIG. 2.
Figure 5:
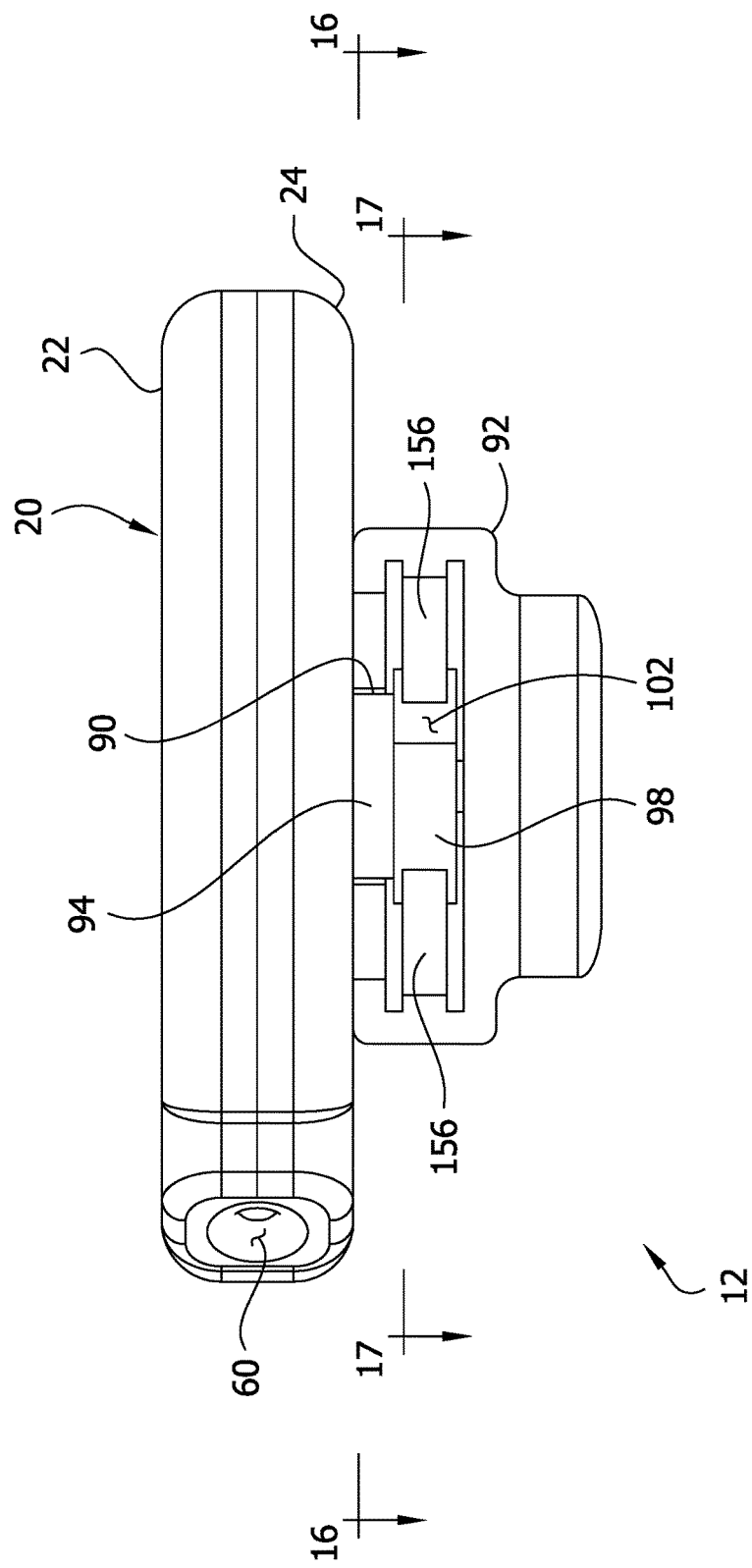
FIG. 5 is a side elevation of the retractor assembly and clip of FIG. 2.

An annular alignment collar or receiver 44 extends axially from a center of the top 40. A tether guide 46 having a radially extending groove 48 extends outward from the annular side 42. As shown in FIG. 2, the upper surface of the upper housing member 22 includes a recess 50 (FIG. 2) for holding a tag or label (not shown) with, for example, identifying information about the pet.

Figure 8:
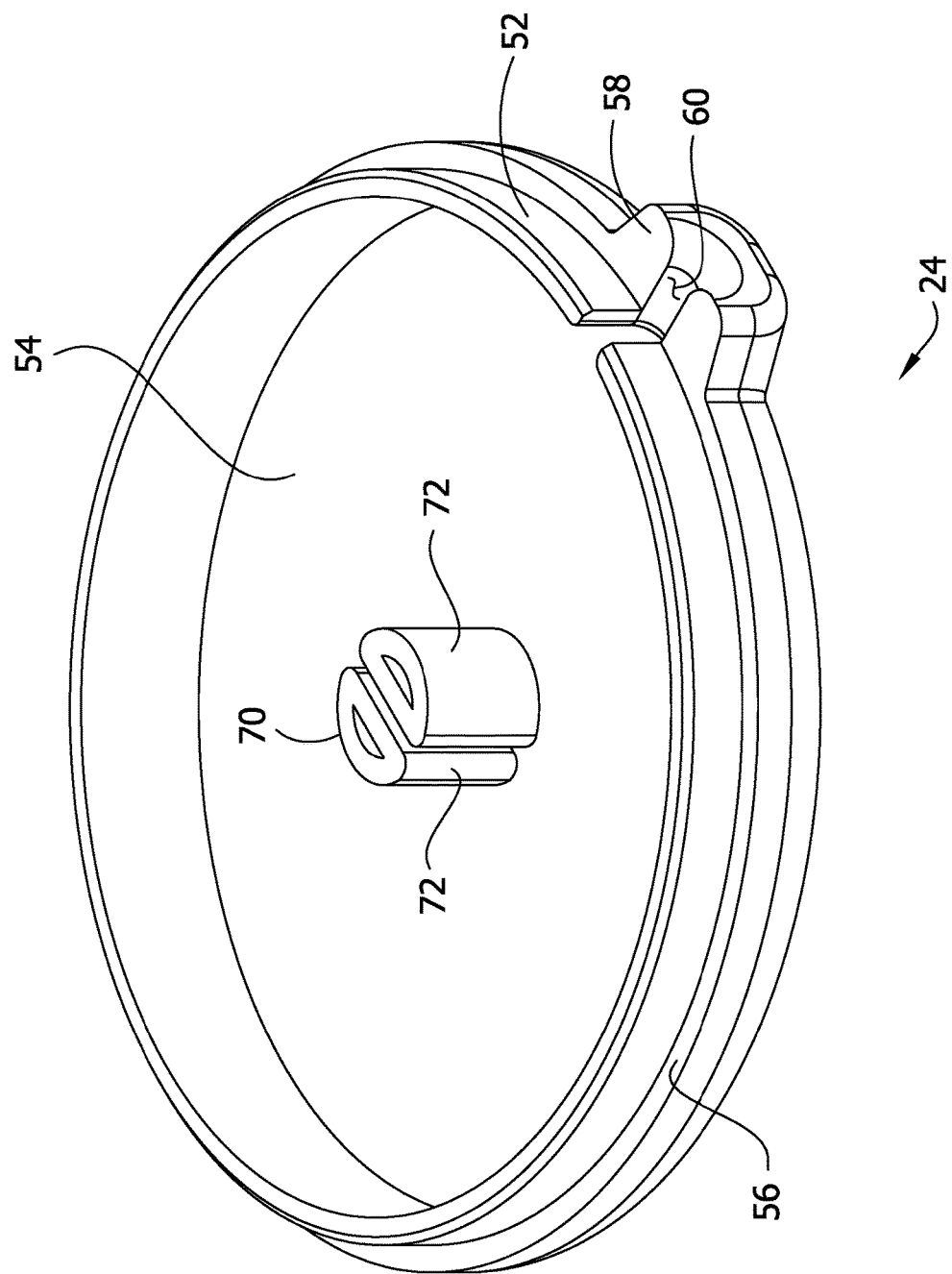
FIG. 8 is a perspective of a lower housing member of the retractor assembly of FIG. 2.

Referring to FIG. 8, the lower housing member 24 includes an annular side 52 that extends axially upward from a perimeter of a generally circular and planar base 54. When the upper housing member 22 is joined to the lower housing member 24, the base 54 and annular side 52 define a lower cavity of the internal chamber 26 (FIG. 6). The annular side 52 has a shoulder 56. As shown in FIG. 6, when the upper housing member 22 is joined to the lower housing member 24, a lower axial end of the side 42 of the upper housing member contacts the shoulder 56 of the lower housing member and the inner surface of the annular side of the upper housing member engages the outer surface of the annular side 52 of the lower housing member. Referring again to FIG. 8, the lower housing member 24 also includes a leash guide 58 that extends outward from the annular side 52. A groove 60 extends through the leash guide 58. When the upper housing member 22 is secured to the lower housing member 24 as shown in FIG. 6, the leash guides 46, 58 are angularly aligned and form a boss having a tether opening or channel 62. In use, the tether 14 extends through the tether opening 62.

Referring again to FIG. 8, a spring retainer 70 extends axially upward from the center of the base 50. In the first illustrated example, the spring retainer 70 includes two spaced projections 72. Each of the projections 72 has a generally flat inner face and an arcuate outer face. The generally flat inner faces are parallel and spaced from one another to receive and retain the end of a spring 80 as described in greater detail below. As shown in FIG. 6, when the upper housing member 22 is joined to the lower housing member 24, the upper end of the spring retainer 70 is received by the annular receiver 44 in the upper housing member.

Figure 9:
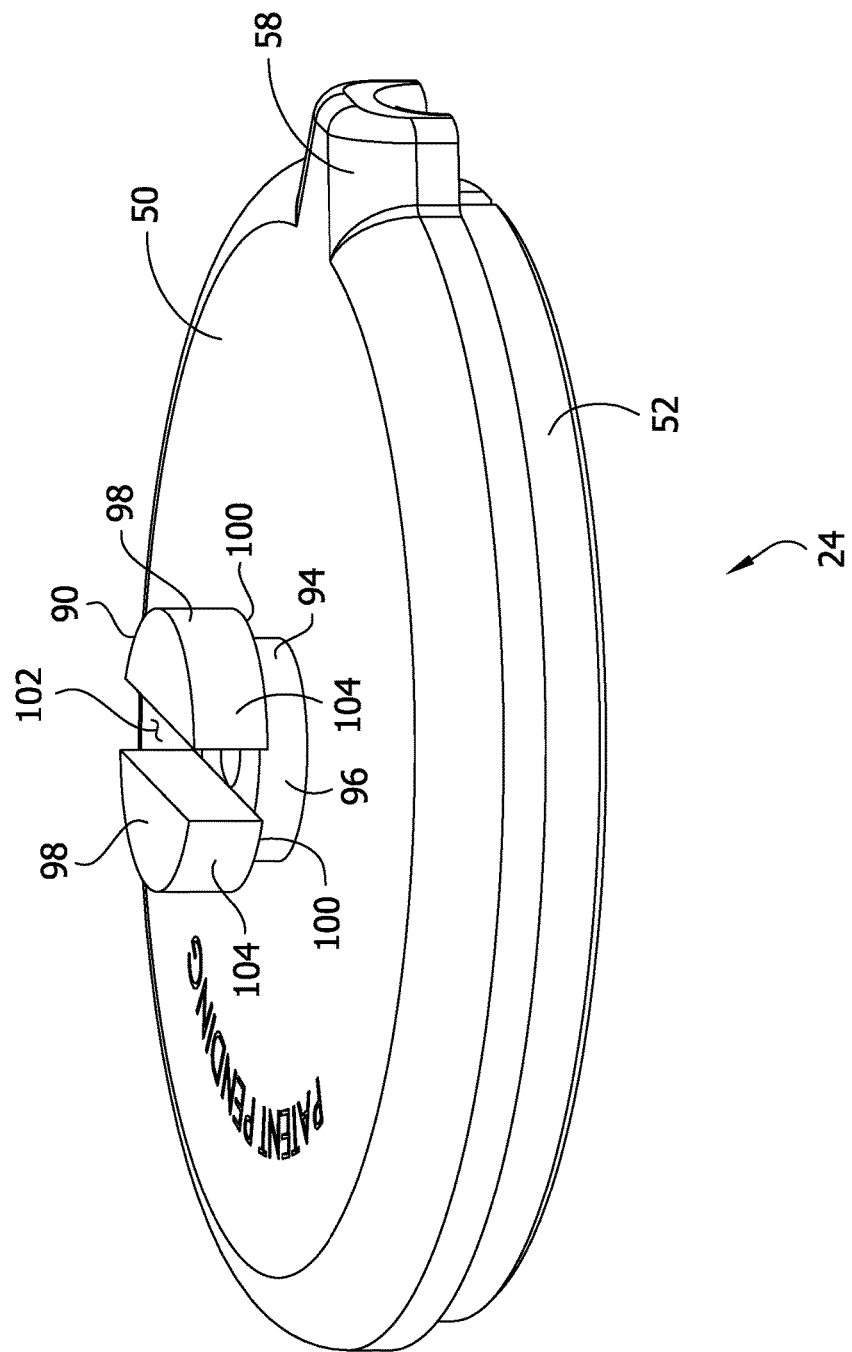
FIG. 9 is another perspective of the lower housing member of FIG. 8.

As shown in FIG. 9, a clip securement boss 90 configured for rotatably connecting a clip or connector 92 to the housing 20 extends axially away from the bottom face of the base 50. In the first illustrated example, the boss 90 includes a circular stem portion 94 adjacent the lower housing member 24. As will be discussed in greater detail below, an outer surface 96 of the stem portion 94 acts as a bearing surface for rotatably engaging the clip 92. A head 98 extends axially from the stem portion 94. The head 98 has a larger diameter than the stem portion 94 so it extends radially outward beyond the outer surface 96 of the stem portion providing a pair of arcuate shoulders 100. In the first illustrated example, the head 98 has a slot 102 that separates the head into two generally semicircular portions. As discussed in greater detail below, the outer surfaces 104 of the head 98, like the outer surface 96 of the stem portion 94, are bearing surfaces configured to rotatably engage the clip 92.

Figure 10:
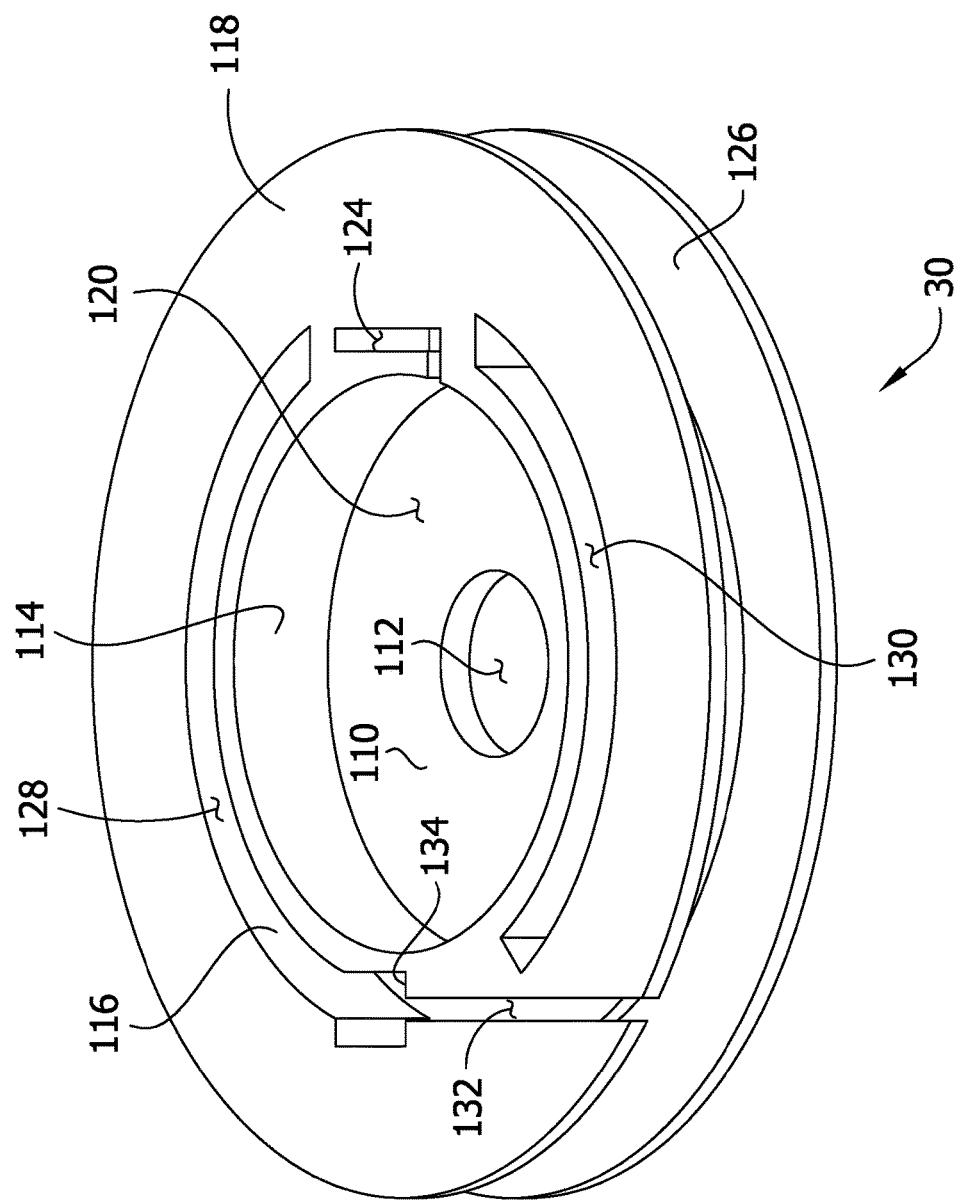
FIG. 10 is a perspective of a spool of the retractor assembly of FIG. 2.
Figure 11:
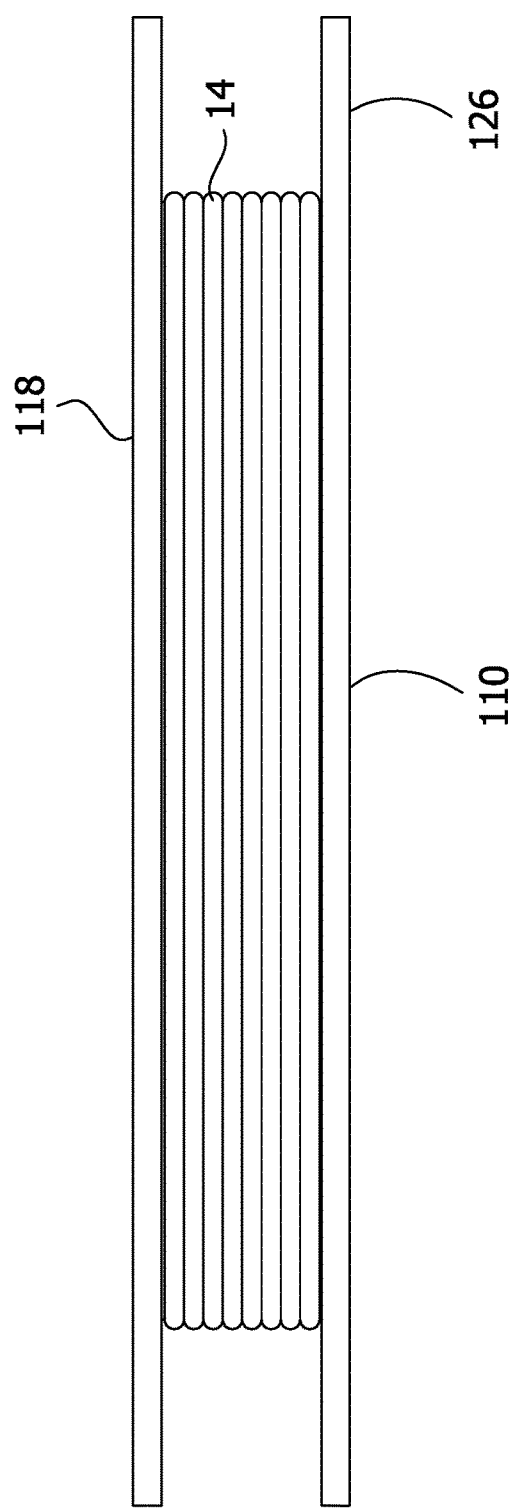
FIG. 11 is a side elevation of the spool of FIG. 10 having a tether wound thereon.
Figure 12:
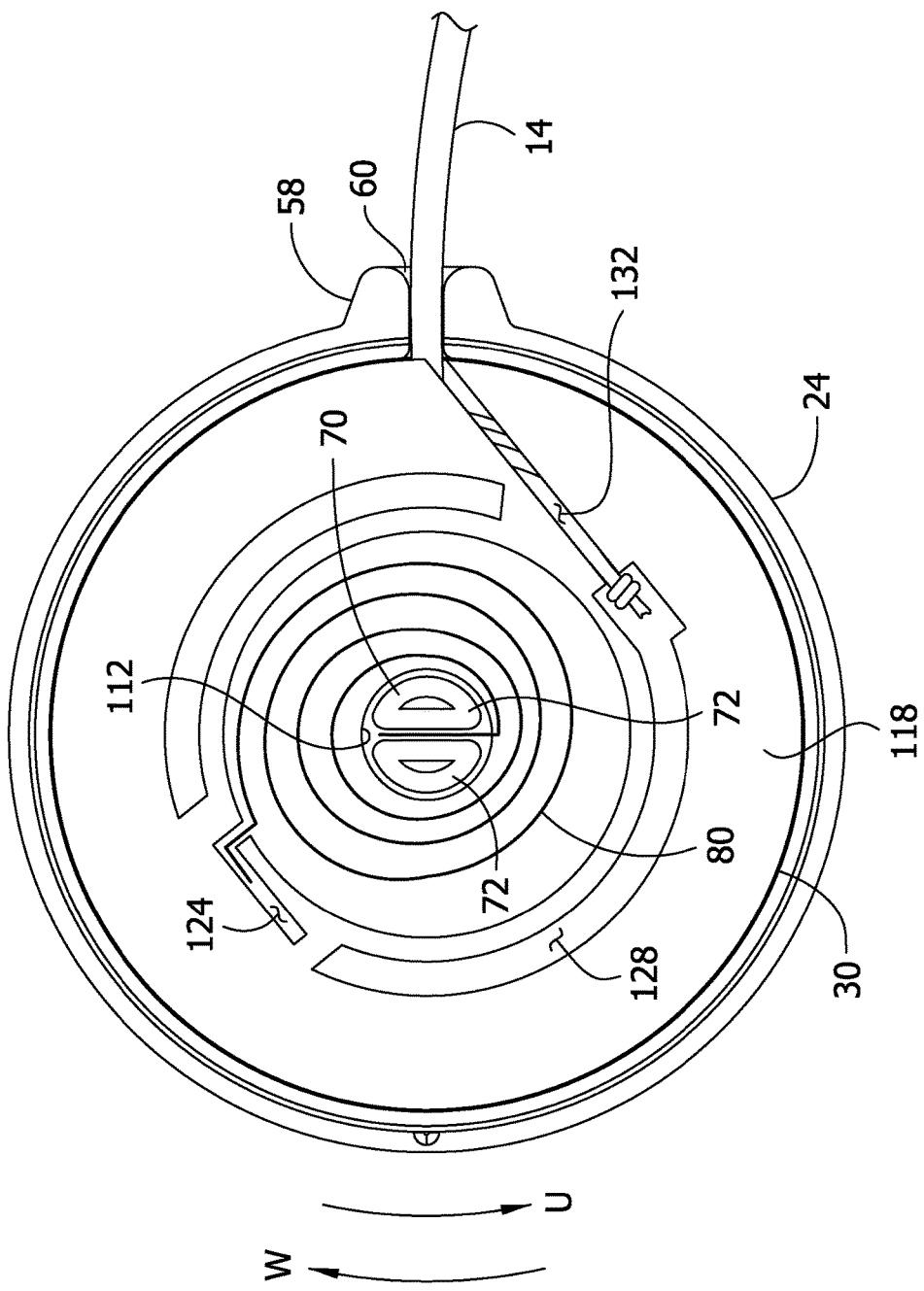
FIG. 12 is a top plan of the spool of FIG. 10 having a retraction spring and tether.
Figure 13:
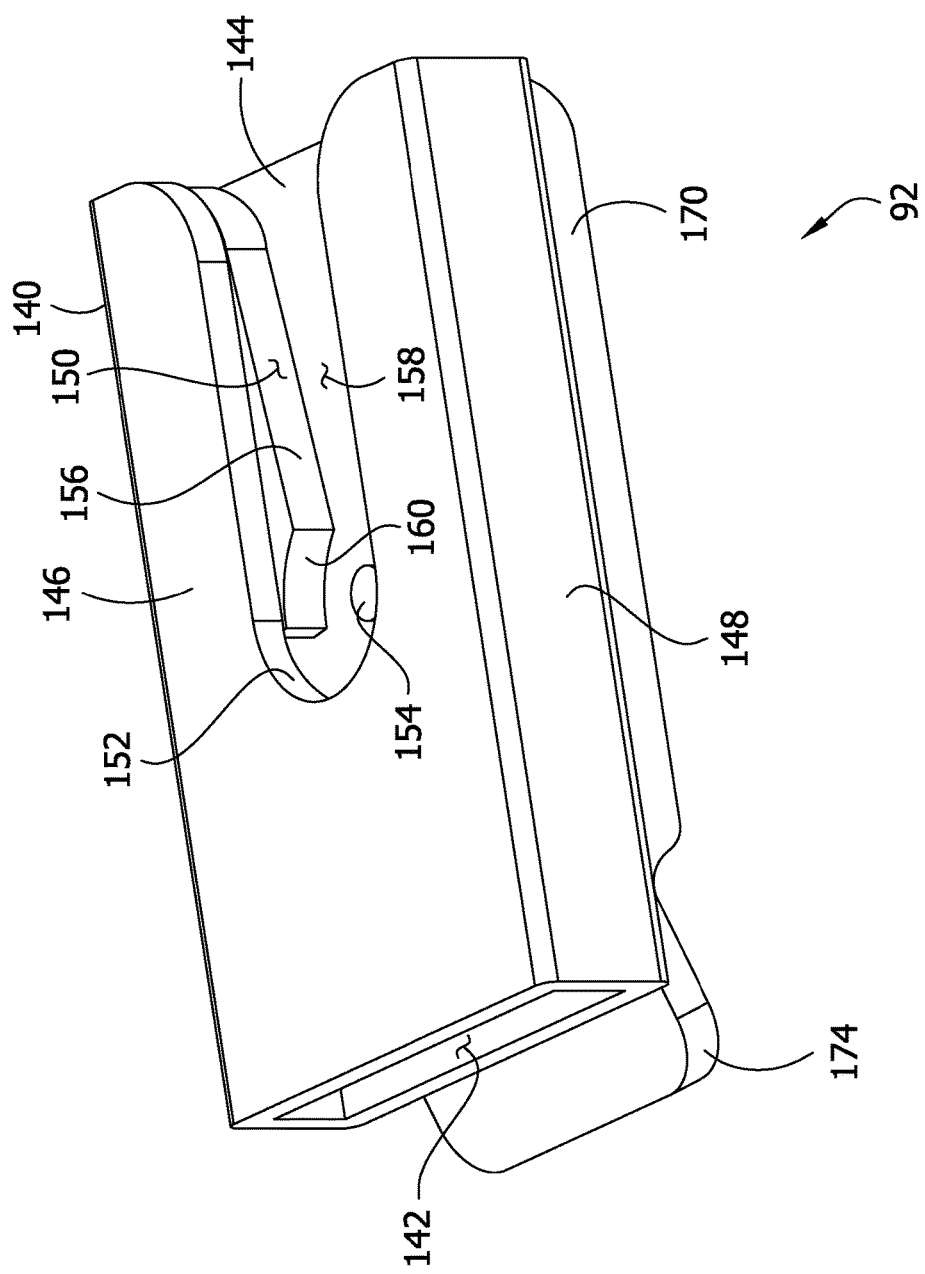
FIG. 13 is a perspective of the clip of FIG. 2.

Referring to FIGS. 10-12, the tether spool 30 includes a generally circular base 110 having a central bore 112. As shown in FIG. 6, the tether spool 30 is configured for receipt in the internal chamber 26 of the housing 20 so the base 110 of the tether spool is positioned adjacent the base 54 of the lower housing member 24 and the spring retainer 70 extends through the central bore 112 in the base 110 so the spool 30 is free to rotate about the spring retainer 70.

Referring further to FIGS. 10-12, the first illustrated tether spool 30 includes an inner annular wall 114 and an outer annular wall 116 that extend axially between the base 110 and a top flange 118. The inner annular wall 114 extends axially away from the base 110 to partially define a cavity 120 sized for receiving the retraction spring 80. A generally L-shaped spring retention slot 124 extends through the inner annular wall 114. As discussed in greater detail below, the spring retention slot 124 is configured to receive an end of the retraction spring 80 to operatively connect the tether spool 30 to the retraction spring. The outer annular wall 116 extends axially away from the base 110 and is partially spaced from the inner wall 114. The tether 14 is wound onto the outer surface of the outer wall 116 between the top flange 118 and the base 110.

In the first illustrated example, the inner wall 114 and the outer wall 116 are spaced from one another to define two arcuate slots 128, 130. One of the arcuate slots 128 is a tether securement slot configured for receiving one end of the flexible tether 14 to operatively secure the tether to the spool 30. A wider end of the arcuate slot 128 connects with a narrow tether passage 132 that extends through the outer wall 116. The wider end of the arcuate slot 128 provides a shoulder 134 between the wider end of the arcuate slot 128 and the narrow tether passage 132 for retaining the tether.

In the first illustrated example, the flexible tether 14 is an elongate cord. In one example, the flexible tether 14 is coated with a polymer for durability. It is also contemplated that other tether constructions (e.g., an elongate ribbon) could be used. As illustrated in FIG. 12, one end of the tether 14 is knotted and inserted in the wider end of the arcuate slot 128. An unknotted length of the tether 14 extends through the tether passage 132 so the knotted end of the tether engages the shoulder 134. A portion of the tether 14 is wound onto the outer winding surface of the outer wall 116. A free end of the wound tether 14 extends through the tether guide channel 60 and is connected to the handhold connector 16 (FIG. 1). As discussed in greater detail below, the retraction spring 80 is configured to resiliently bias the spool 30 toward a wound position 20 in which the tether 14 is wound onto the spool until the handhold connector 16 engages the leash guides 46, 58. As shown in FIG. 12, when tension is applied against the free end of the tether 14, the spool 30 rotates about the spring retainer 70 in the unwinding direction U to let out the tether. When the tension on the tether 14 is released, the retraction spring 80 rotates the spool 30 about the spring retainer 80 in the winding direction W to rewind the tether and return the spool to the wound position.

The retraction spring 80, which is schematically illustrated throughout the drawings, is preferably a coiled resilient spring. Although different materials may be used, in one example the spring 80 is a ribbon of spring steel. The outer end of the retraction spring 80 extends into the spring retention slot 124 to secure the spring to the spool 30. When the spool 30 is rotatably mounted on the lower housing member 24, the inner end of the retraction spring 80 extends between the two projections 72 of the spring retainer 70 and is secured to the spring retainer. Preferably the retraction spring 80 is secured to the spool 30 and housing 20 so spring resiliently biases the spool toward the wound position relative the housing 20. When the tether 14 is let out, the spring 80 resiliently deforms due to the rotation of the spool in the unwinding direction U. When tension on the tether 14 is released, the spring 80 returns toward its undeformed position and rotates the spool 30 in the winding direction W.

Figure 14:
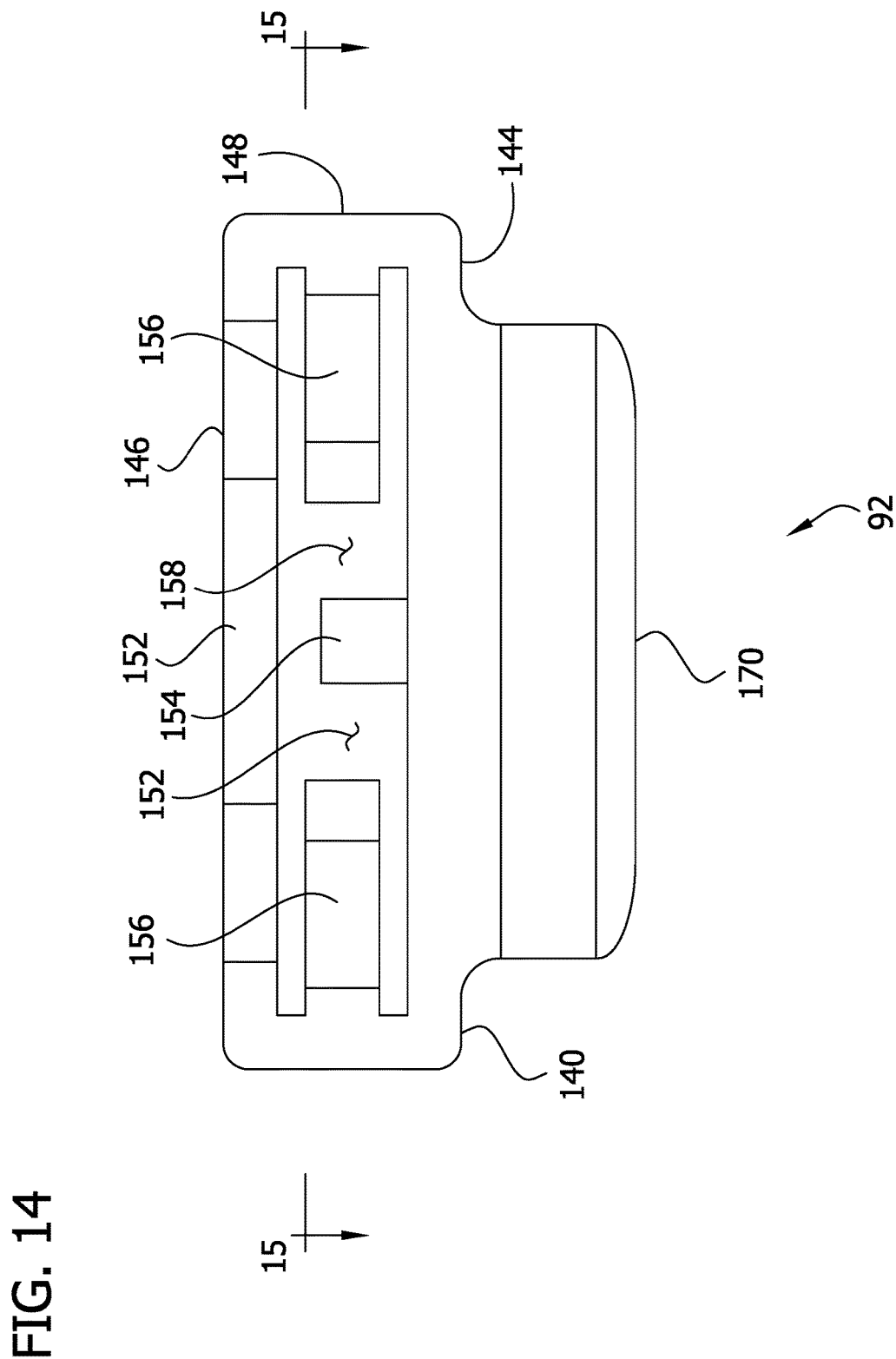
FIG. 14 is an end elevation of the clip of FIG. 2.
Figure 15:
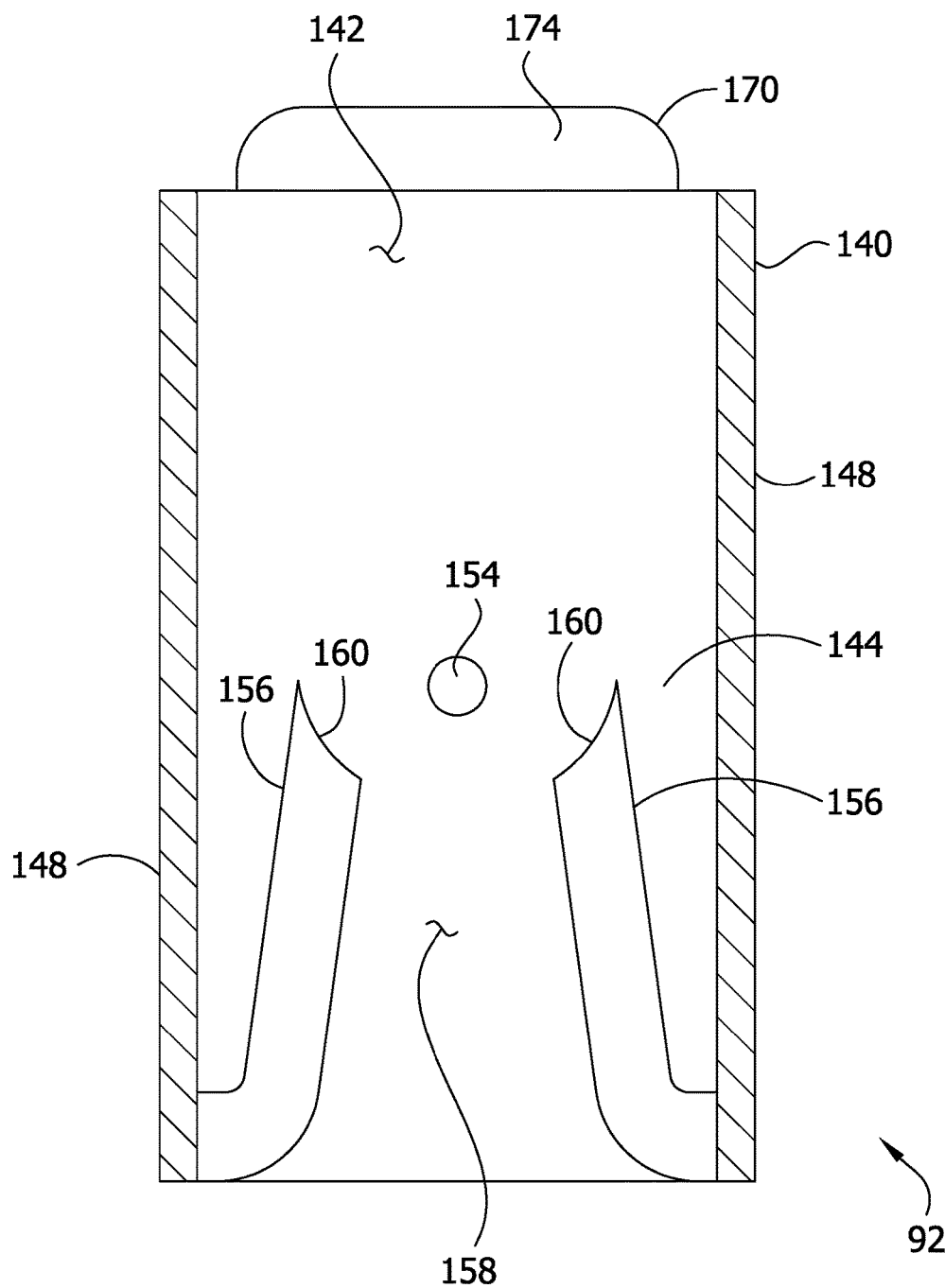
FIG. 15 is a section taken in the plane of line 15-15 of FIG. 14.
Figure 16:
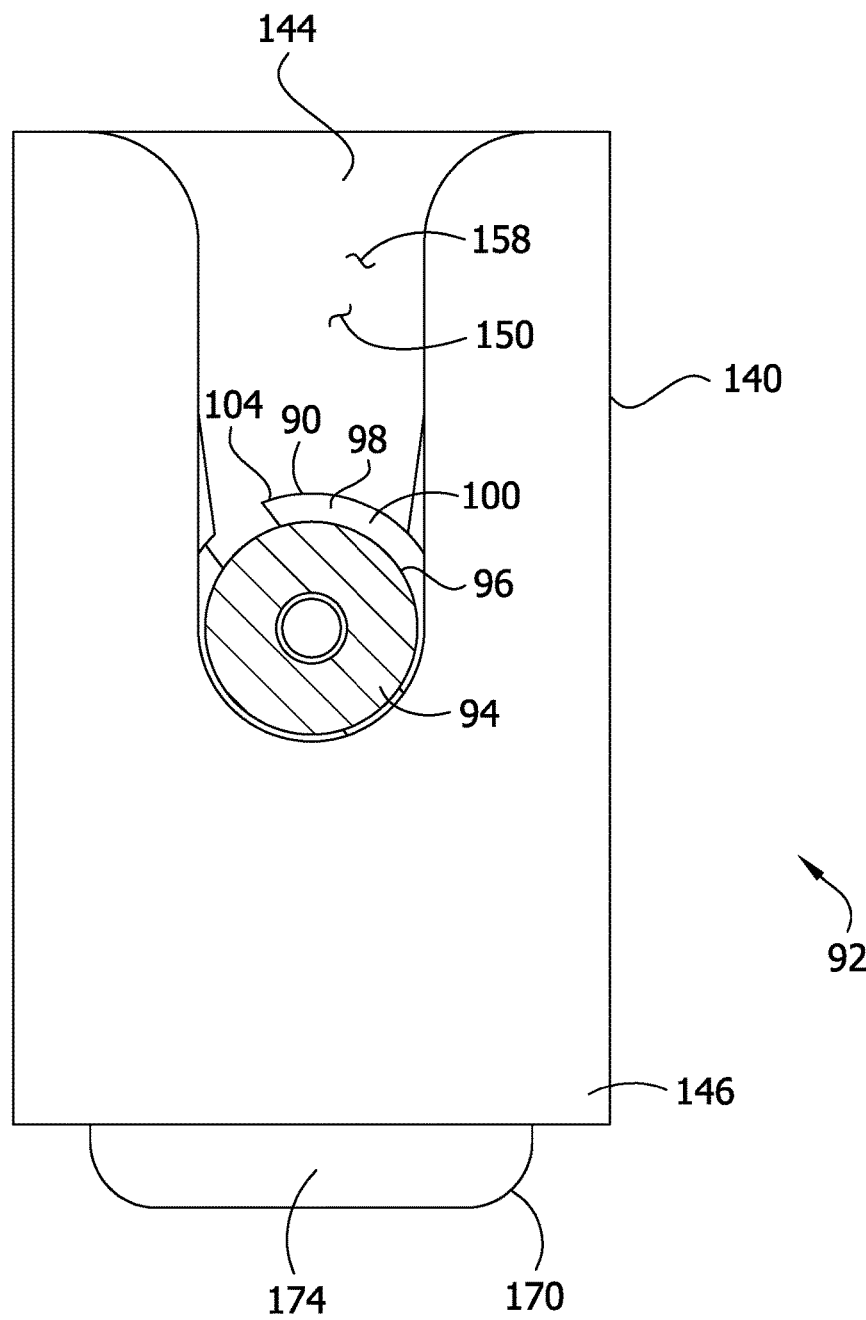
FIG. 16 is a section taken in the plane of line 16-16 of FIG. 5.
Figure 17:
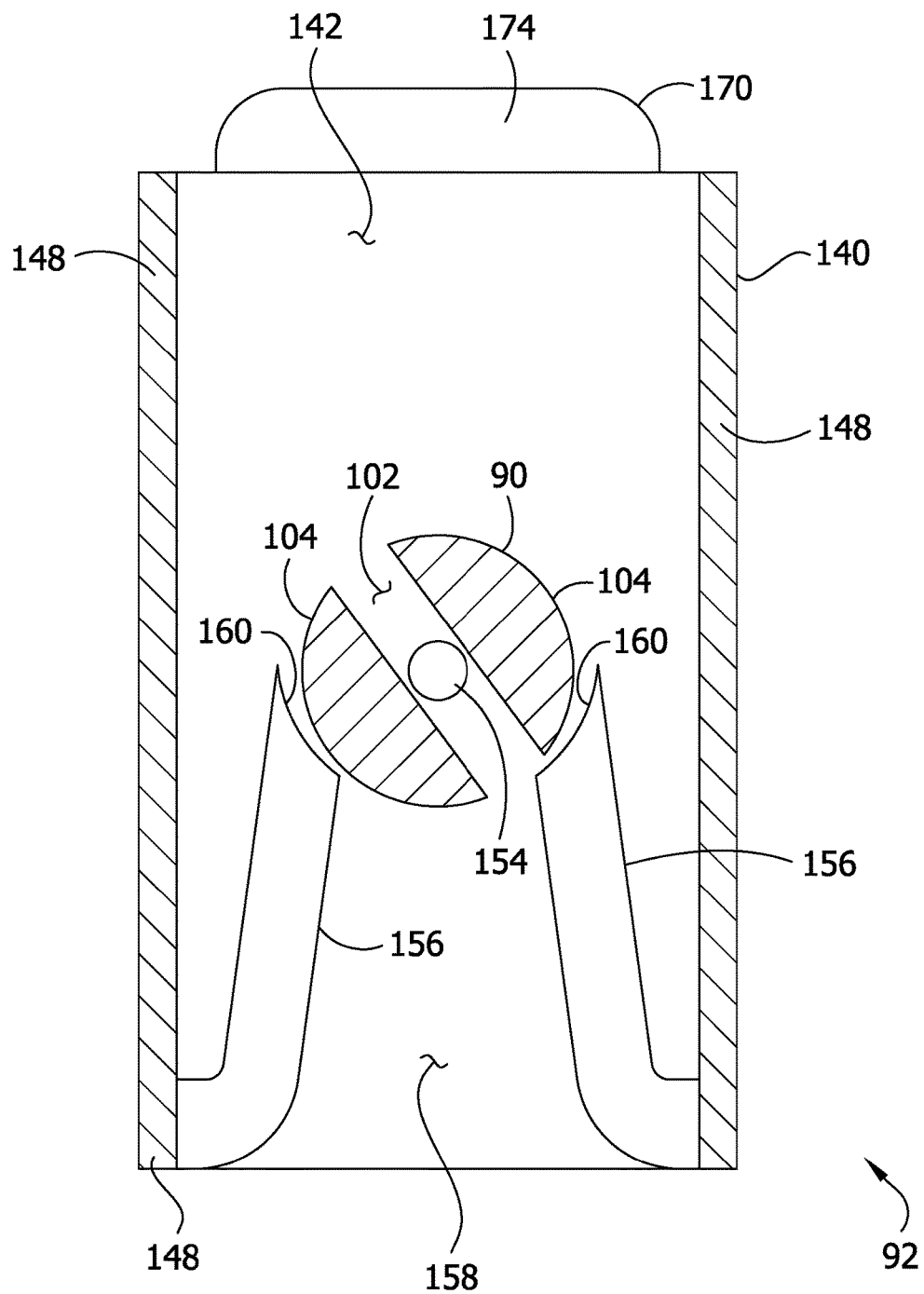
FIG. 17 is a section taken in the plane of line 17-17 of FIG. 5.

Referring to FIGS. 13-18, the clip 92 is configured to rotatably secure the housing 20 of the retractor assembly 12 to a pet collar or other garment. In the illustrated example, the clip 92 includes an enclosure 140, which defines a pocket or receptacle 142 for receiving the clip securement boss 90 therein. The enclosure 140 includes a base 144, top 146, and opposite sides 148. An elongate slot 150 is formed in one end of the top 146. The slot 150 has an arcuate surface 152. A cylindrical pin 154 extends from the base 144 toward the top 146 near the center of the enclosure 140. A pair of retention arms or members 156 extends inward from opposite sides 148 at the open end of the slot 150 into the receptacle 142. As shown in FIG. 14, the retention arms 156 are spaced from the base 144 and top 146. As shown in FIGS. 15-17, portions of each of the retention arms 156 are also spaced from the corresponding side 148. Each retention arm 156 angles away from the corresponding side 148 and toward the other retention arm as the retention member extends toward the closed end of the slot 150. Together, the retention arms 156 define a passage 158 that narrows as it extends away from the open end of the slot 150. The free end of each retention arm 156 includes an arcuate surface 160.

Referring to FIGS. 6, 16, and 17, the enclosure 140 is configured to receive the clip securement boss 90 of the housing 20 to operatively secure the housing 20 to the clip 92 for rotation about the cylindrical pin 154. When the clip 92 is in the operative position relative the housing 20, the clip securement boss 90 extends through the slot 150 in the top 146 into the receptacle 142. The cylindrical pin 154 is received in the slot 102 formed in the head 98 of the boss 90. The bearing surfaces 104 of the head 98 rotatably engage the arcuate surfaces 160 of the retention arms 156. This engagement between the bearing surfaces 104 of the head 98 and the arcuate surfaces 160 of the retention arms 156 inhibits the boss 90 from moving out of the receptacle 142. The outer surface 96 of the stem 94 rotatably engages the arcuate end surface 152 of slot 150. The engagement between the outer surface 96 of the stem 94 and the arcuate surface 152 prevents the boss 90 from moving out of the receptacle 150. The shoulders 100 of the head 98 engage the top 146 of the clip 92 to prevent the boss 90 from separating from the enclosure 140. Together, the arcuate surfaces 152, 160 and the pin 154, base 144, and top 146, engage the clip securement boss 90 allowing the boss to rotate around the pin, but preventing all other movement of the retractor assembly 12 relative the clip 92.

The housing 20 is configured to be secured to the clip 92 by inserting the clip securement boss 90 into the proximal end of the enclosure 140 so that the stem 94 extends axially through the elongate slot 150 and the head 98 is received in the passage 158 between the retention arms 156. With the clip securement boss 90 inserted within the proximal end of the enclosure 140, the housing 20 slides toward the closed end 152 of the slot 150 until the boss is in the operative position relative the enclosure. Preferably, the slot 102 is oriented to receive the pin 154 as the housing 20 slides relative the clip. As the boss 90 slides along in the passage 158, the head 98 engages the inboard sides of the retention arms 156 and bend the arms outward until the head passes the free ends of the retention arms. In the first illustrated example, the retention arms 156 resiliently bend so that, after the head 98 passes the ends of the retention arms, the retention arms return to their original position to capture the head in the enclosure 140.

Figure 18:
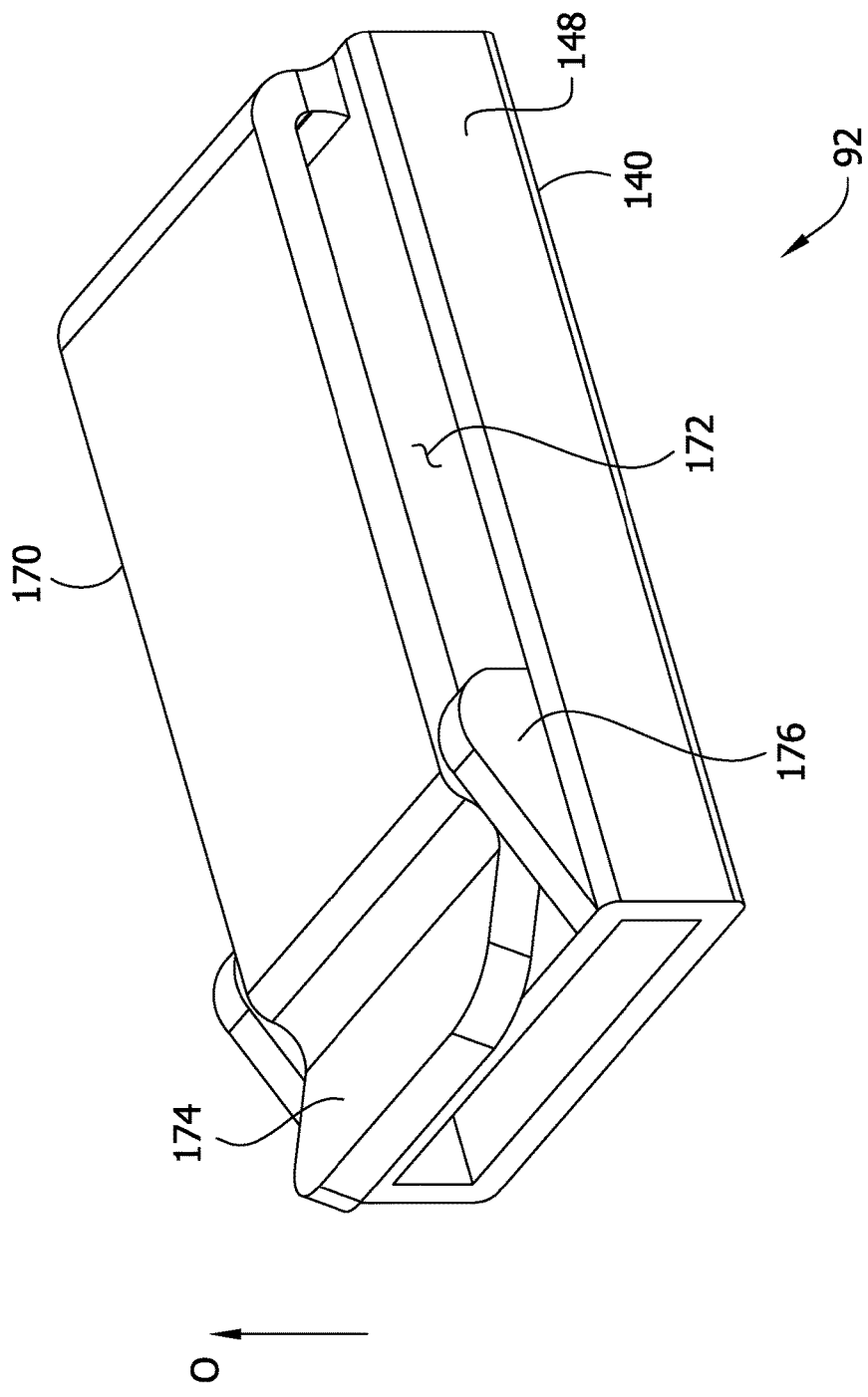
FIG. 18 is another perspective of the clip of FIG. 2.

Referring to FIG. 18, the illustrated clip 92 includes a collar retainer clasp 170 attached to the base 144 of the enclosure 140. A length of the clasp 170 is spaced from and extends parallel to the base 144 to define a collar receiving slot 172. The clip is configured to receive a collar (not shown) through the collar slot 172 between the collar retainer clasp 170 and the enclosure 144. In the first illustrated example, the clasp 170 has a free end that angles toward the enclosure 140 so the collar slot 172 narrows at the free end before angling away from the enclosure to provide a lip 174 for gripping the clasp. When the lip 174 is moved in a clip-opening direction O, the free end of the clasp 170 resiliently separates from the enclosure 140 to open the collar slot 172 to receive the collar. A wing 173 extends from the enclosure 140 adjacent the free end of the clasp 170 to prevent a collar received in the slot 172 from sliding out of the collar slot when the clasp is undeformed.

Figure 19:
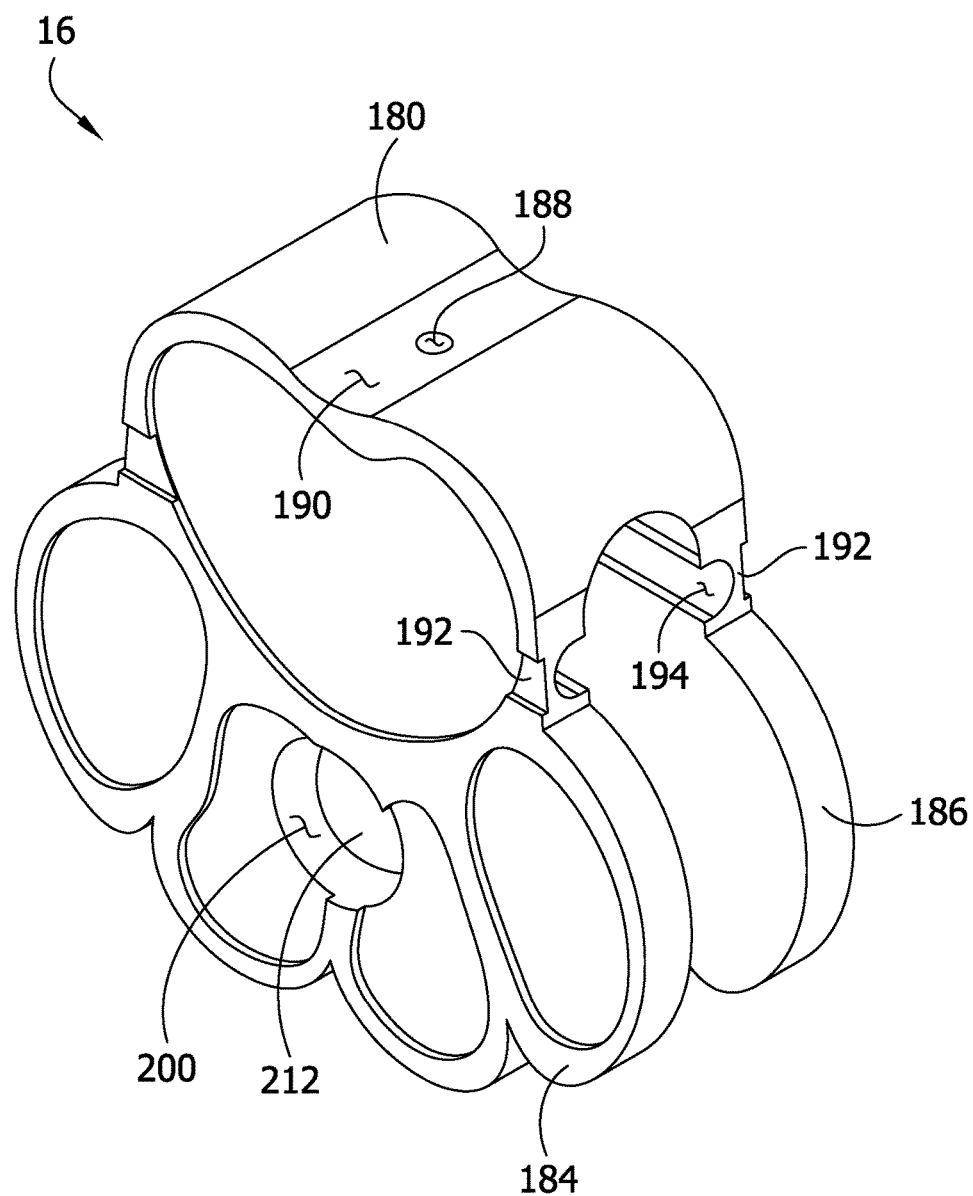
FIG. 19 is a perspective of a first example of a handhold connector.
Figure 20:
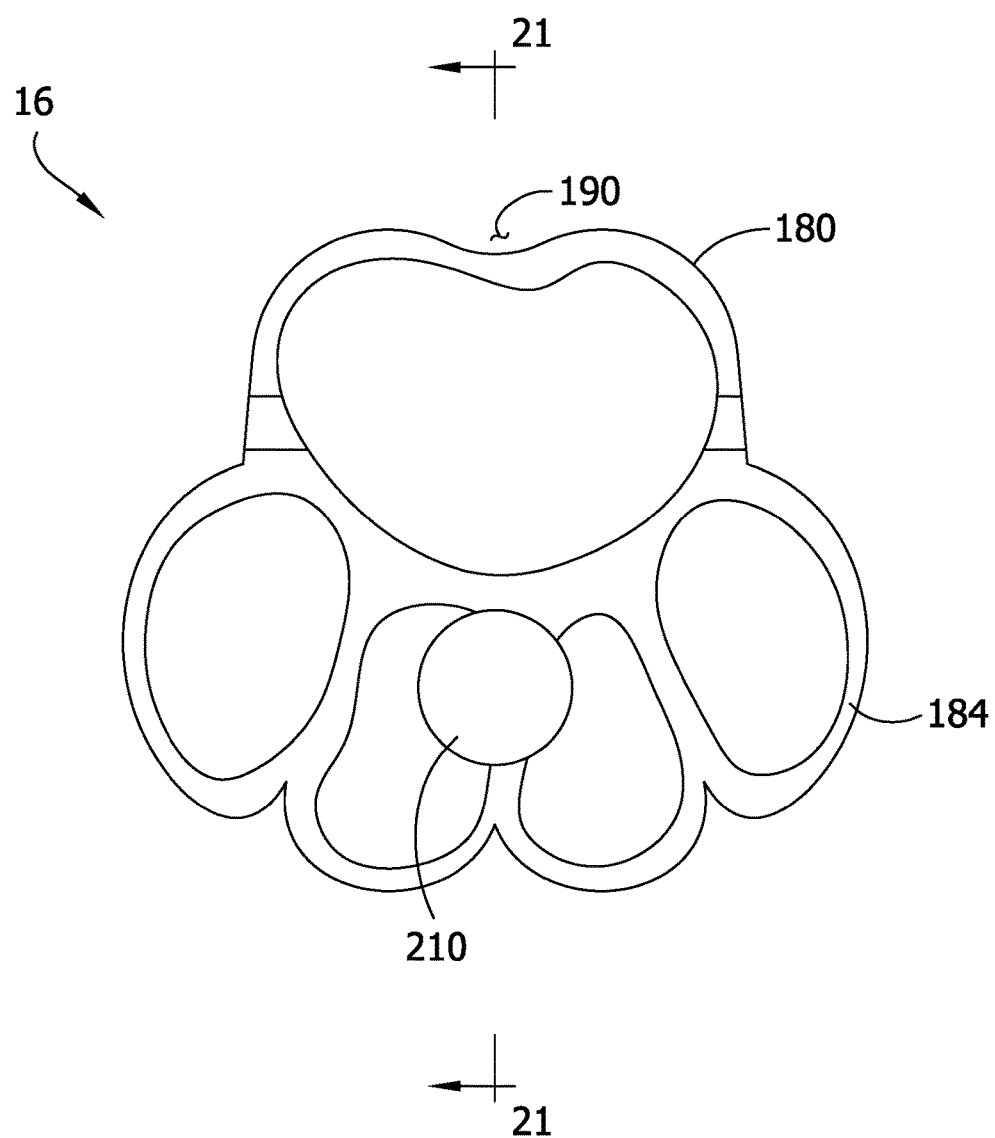
FIG. 20 is an elevation of the handhold connector of FIG. 19.
Figure 21:
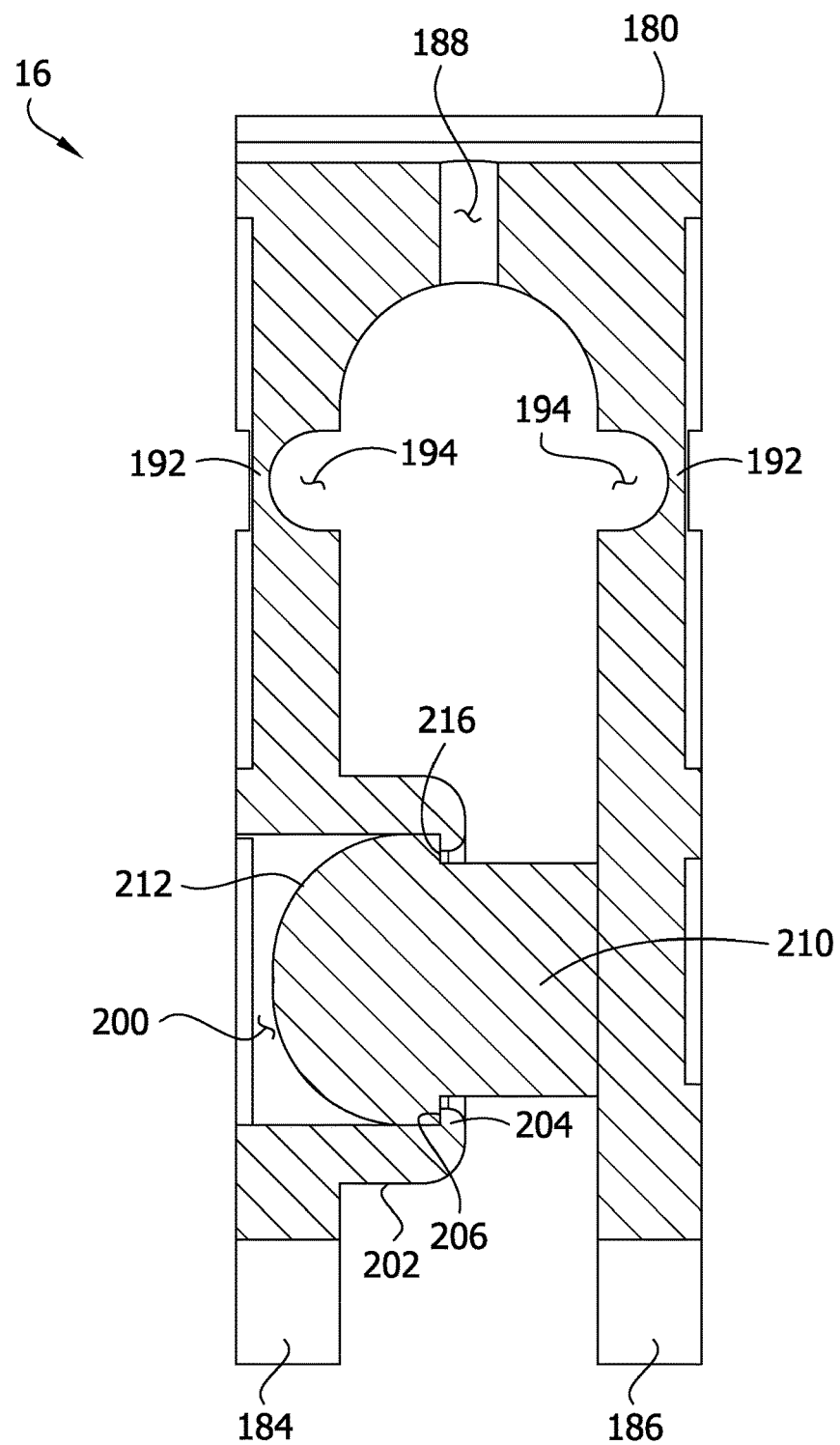
FIG. 21 is a section taken in the plane of line 21-21 of FIG. 20.

Referring to FIGS. 19-21, the handhold connector 16 is selectively securable to any of a plurality of different handholds such as loops, T-bars, flat straps, pompoms, and various decorative handholds. In the first illustrated example, the handhold connector 16 has an ornamental paw shape. It is understood, however, that the handhold connector may have other ornamental designs. The illustrated handhold connector 16 is made from a one-piece body of plastic, but it is envisioned that the connectors can be made from multiple pieces and/or different materials.

The handhold connector 16 has a base 180 and first and second legs 184, 186 (each having a paw-shaped appearance) extending from the base. A hole 188 extends through the base 180. In use, a free end of the tether 14 extends through the hole 188 in the base 180 and is knotted to secure the handhold connector 16 to the tether. The outer surface of the base 180 is curved providing a slight recess 190 so that when the tether 14 is wound onto the spool 30 the boss on the housing 20 is accommodated by the recess.

Living hinges 192 pivotally connect the base 180 to the legs 184, 186. In the illustrated example, an elongate channel 194 is formed in an interior surface of each of the legs 184, 186 to reduce the thickness of the corresponding leg to form the living hinge. As a result, each of the legs 184, 186 is compliantly deformable at the respective living hinge 192. By bending one or both of the legs 184, 186 outward at the respective living hinge 192, the legs move from the illustrated closed position, in which the legs are oriented generally parallel in spaced relationship with one another, to an open position (not shown), in which the legs splay away from one another. Though the illustrated example uses living hinges 192 to connect the legs 184, 186 to the base 180, it is contemplated that the legs of a handhold connector may be pivotally connected to the base by other means.

The first and second legs 184, 186 are configured to be releasably secured in the closed position. The first leg 184 has an opening 200 and an annular collar 202 (broadly, a first interlocking formation) surrounding the opening and extending inward into the space between the first and second legs 184, 186. The free end of the collar 202 includes a rim 204 that extends radially inward into the opening 200 to form portion of a detent. A connector pin 210 (broadly, a second interlocking formation) configured for releasable, interlocking engagement with the collar 202 extends from the second leg 186 inward into the space between the first and second legs 184, 186 when the handhold connector 16 is closed. The pin 210 extends from (e.g., integrally formed with) the second leg 186, and has an enlarged head 212. The head 214 of the connector has a shoulder 216. When the handhold connector 16 is closed, the rim 206 of the collar 202 interlockingly engages the shoulder 216 of the pin 210 to releasably secure the connector in the closed position.

The handhold connector 16 is configured to receive a loop of a handhold to secure the handhold to the leash 10. When the connector 16 is in the open position, the head 212 of the pin 210 is inserted through the loop of the handhold and the connector is returned to the closed position. In the closed position, the rim 206 of the collar 202 engages the shoulder 216 of the pin 210 to secure the connector 16 in the closed position and to prevent the loop of the handhold from disconnecting from the connector 16. As will be appreciated by those skilled in the art, the pin and collar configuration described above is commonly referred to as a detent.

Figure 22:
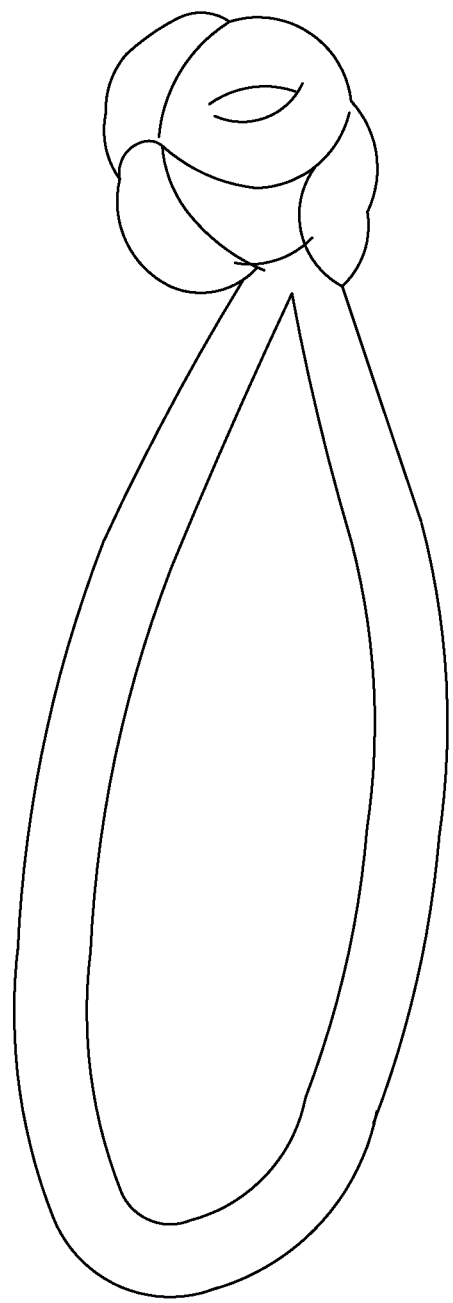
FIG. 22 is a perspective of a first example of a handhold.
Figure 23:
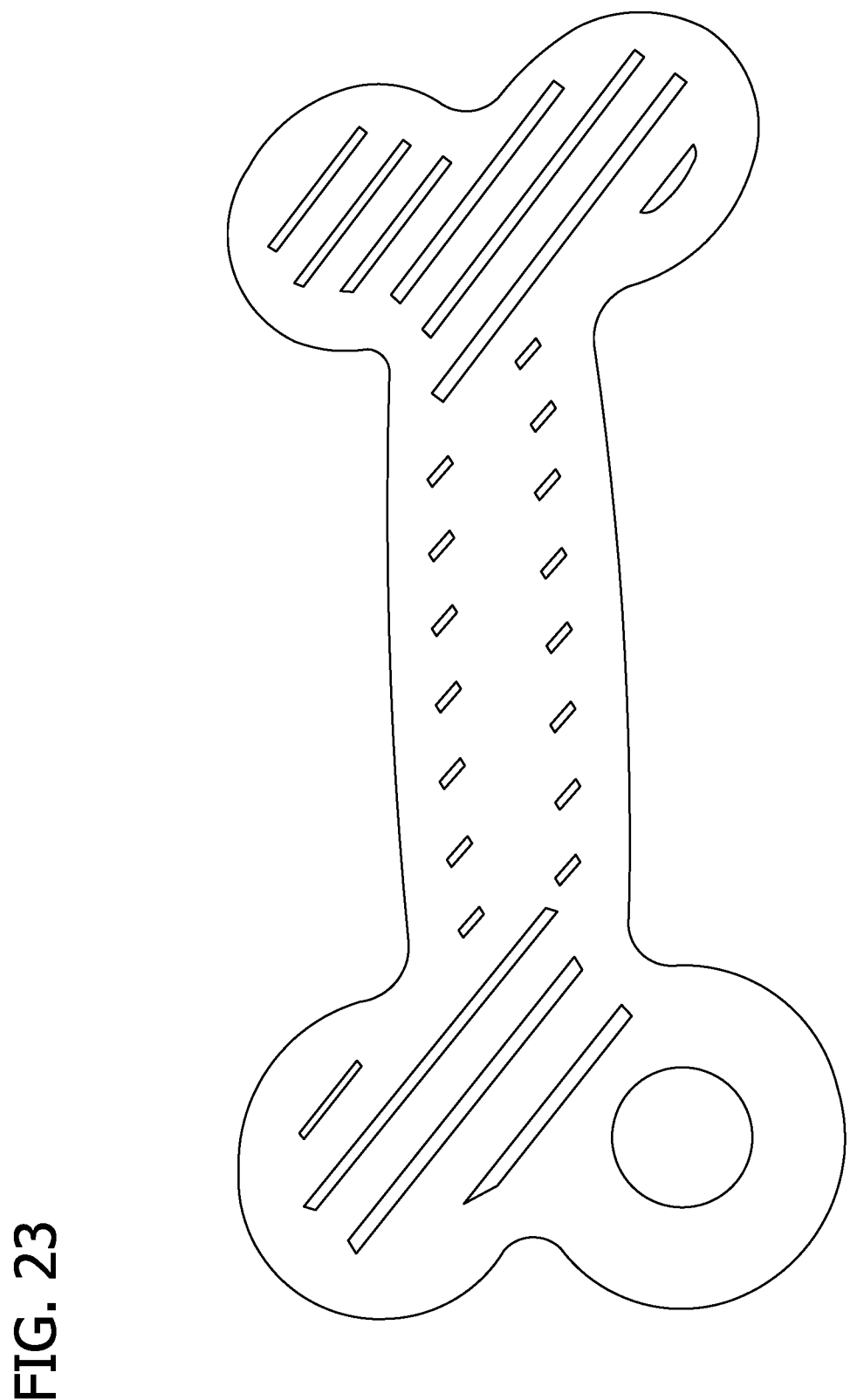
FIG. 23 is a perspective of second example of a handhold.

Two exemplary handholds 230, 232 are illustrated in FIGS. 22 and 23. The first handhold 230 includes a length of braided nylon cord formed in a loop and the free ends are formed in a monkey knot. The loop of the handhold 230 is configured to receive the pin 210 to secure the handhold to the connector 16. The second handhold 232 includes a bone-shaped body with a circular opening (broadly, a loop) for receiving the pin 210.

To assemble the retractable leash 10, one end of the tether 14 is knotted and inserted into the wider end of the arcuate slot 128 in the spool 30 so the free end of the tether extends through the tether passage 132. The tether 14 is partially wound onto the outer surface of the outer wall 116 of the spool 30 between the top flange 118 and the base 110. The retraction spring 80 is inserted into the cavity 120 defined by the inner wall 114 of the spool 30 so the outer end of the spring is received in the spring retention slot 124 and secured to the spool. The partially wound spool 30 is installed in the lower housing member 24 so the base 110 of the spool is positioned adjacent the base 54 of the lower housing member. More specifically, the spring retainer 70 extends through the central bore 112 of spool 30, and the inner end of the spring 80 extends between the opposed projections 72 of the spring retainer securing it to the retainer. The free end of the tether 14 is aligned with the groove 58, and the upper housing member 22 is joined to the lower housing member 24. When the upper housing member 22 joins the lower housing member 24, the tether 14 extends through the tether guide channel 60 formed by the grooves 46, 58.

The free end of the tether 14 is threaded through the hole 188 in the base 180 of the handhold connector 16 and knotted to secure the handhold connector to the retractor assembly 12. The clip 92 is secured to the housing 20 by inserting the clip securement boss 90 into the collar so the stem 94 slides through the elongate slot 150 and the head 98 is received in the passage 158 between the retention arms 156. With the clip securement boss 90 inserted within the enclosure 140, the housing 20 is moved relative the clip 92 until the connector pin 210 is in the operative position relative the enclosure. As the boss 90 slides in the passage 158, the head 98 engages the inboard sides of the retention arms 156 and bend the retention arms outward until the head pass the free ends of the retention arms. After the head 98 passes the free ends of the retention arms, the retention arms return to their original position. To secure the retractor assembly 12 to the collar of a pet (not shown), the lip 174 of the clasp 70 is separated from the base 144 of the enclosure 140 and the collar is inserted into the collar slot.

To secure a handhold to the connector 16, the first and second legs 184, 186 are pulled apart to open the connector. When pulled apart, the legs 184, 186 bend at the living hinges 192. The pin 210 is threaded through a loop of the handhold, and the first and second legs 184, 186 are pushed toward one another until they reach the closed position. In the closed position, the rim 206 of the collar 202 engages the shoulder 216 of the pin 210 to fasten the connector in the closed position and secure the loop of the handhold around the pin 210.

In use, the retractor assembly 12 is secured to the collar of a pet so the pet carries the assembly. Any number of interchangeable handholds can be selectively connected to the handhold connector 16. When the retractable leash 10 is not in use, the spool 30 is in the wound position so that the tether 14 is wound around the spool and the handhold connector 16 engages the boss on housing 20. When the tether 14 is extended, the retractor assembly 12 can rotate relative the clip 92 so the angle of the tether 14 relative the collar changes so the ether does not bind on the housing.

Referring to FIGS. 24-27, a second example of a retractor assembly is generally indicated at reference number 312. The retractor assembly 312 is similar to the retractor assembly 12 of the first example. Features of the retractor assembly 312 are numbered similarly to corresponding features of the retractor assembly 12 except 300 is added to them. The retractor assembly 312 includes a housing 320 having an upper housing member 322 and a lower housing member 324 that are joined together to house a leash retraction system (including, e.g., a spool, tether, and retraction spring, which are not shown). The upper and lower housing arms 322, 324 have a substantially similar shape to the upper and lower housing arms 22, 24 of the first example. Two tether-retaining projections 325 project outward from the annular side of the housing 320. The tether-retaining projections 325 are spaced apart to receive a tether (not shown) of the retractor assembly 312. Preferably, the end of the tether includes a handhold connector 16 or other enlarged structure. With the tether positioned between the tether-retaining projections 325, the retractor assembly 312 retracts the tether until the handhold connector 16 engages the projections.

Figure 25:
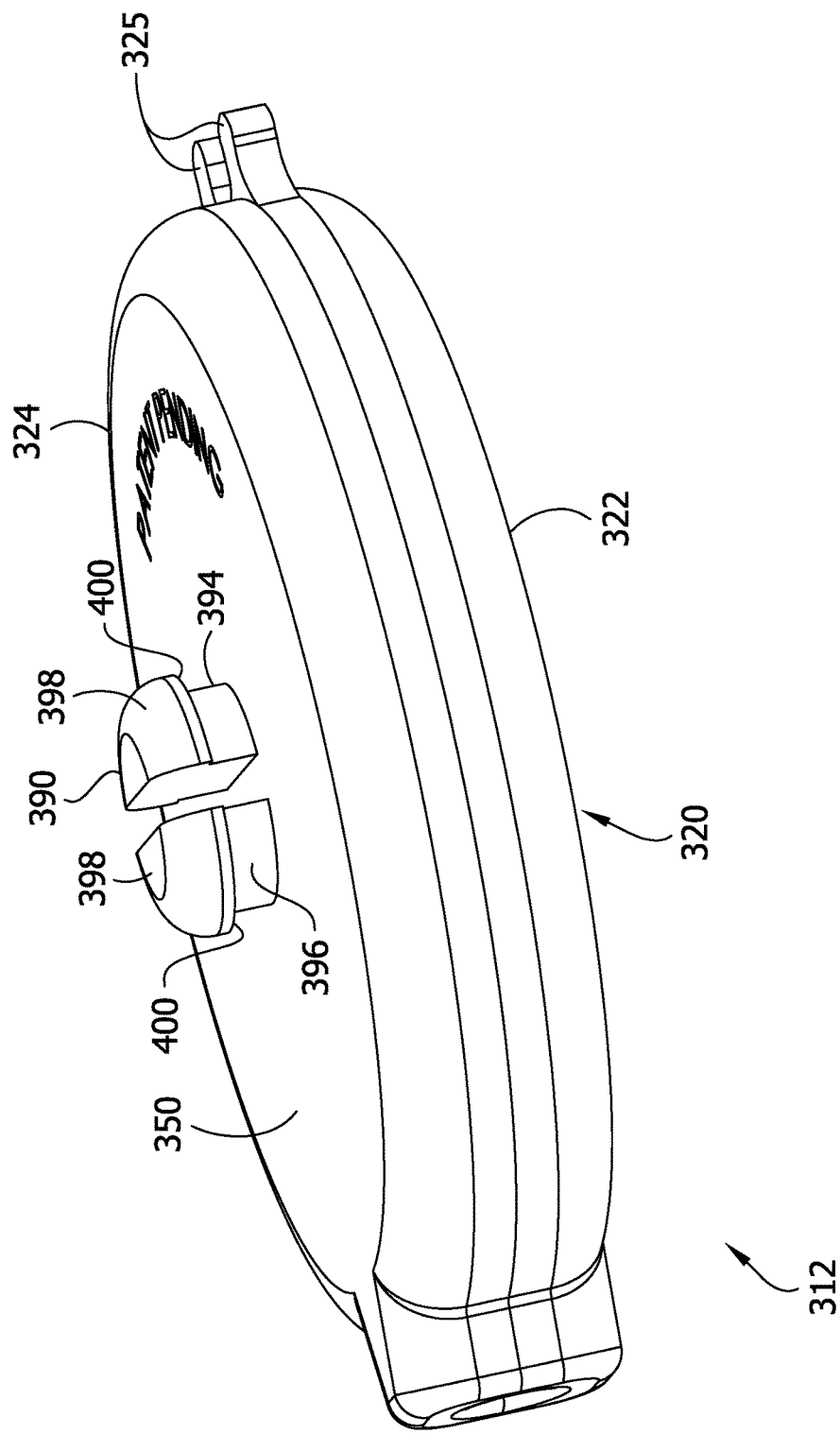
FIG. 25 is a perspective of the retractor assembly of FIG. 24.

Like the lower housing member 22 of the retractor assembly 12, the lower housing member 324 includes a clip securement boss 390 configured for rotatably mounting a clip 392 to the housing 320. As shown in FIG. 25, the clip securement boss 390 includes a stem 394 having an outer bearing surface 396 and a head 398 that extends radially outward from the end of the stem to define arcuate shoulders 400.

Figure 24:
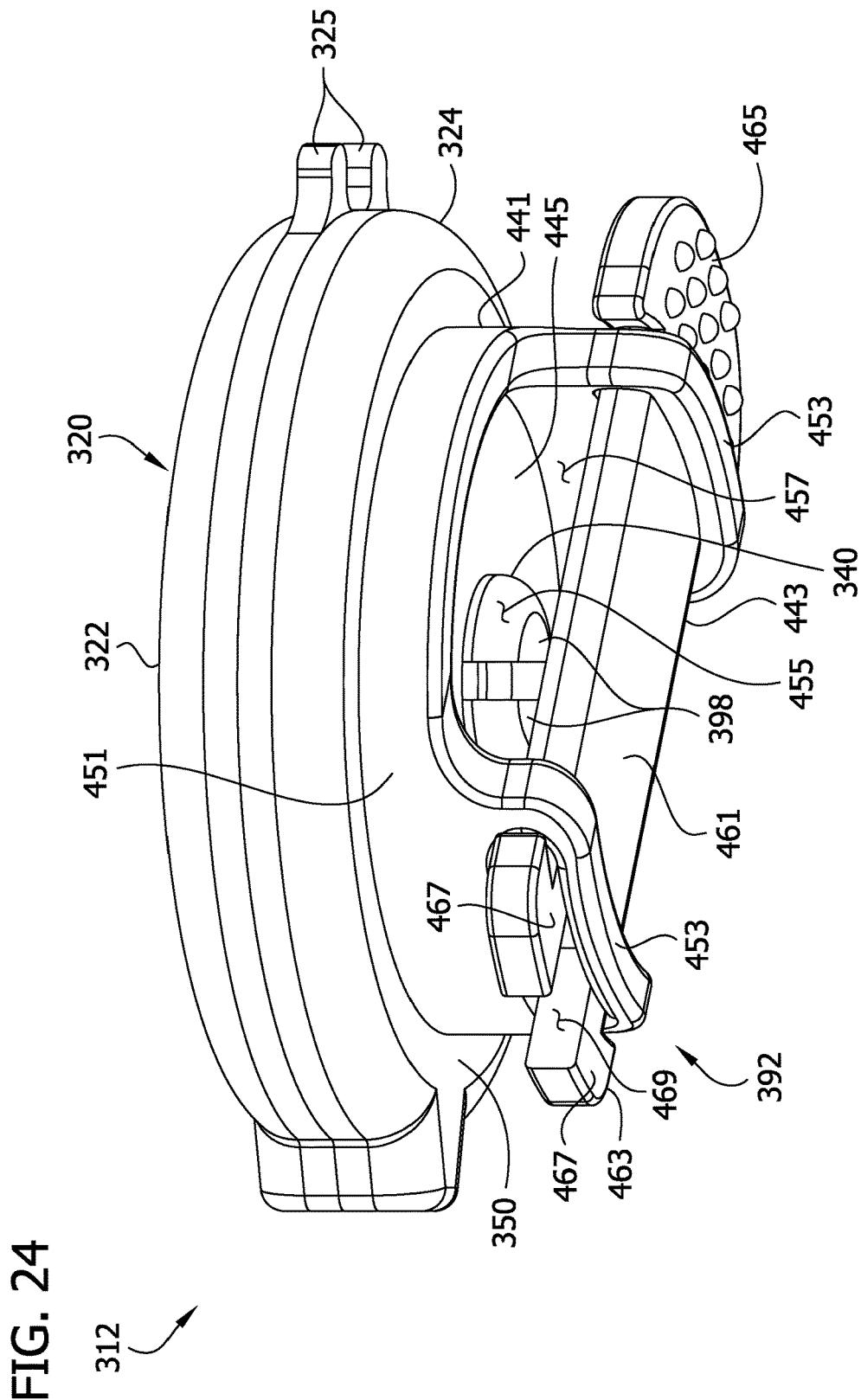
FIG. 24 is a perspective of second example of a retractor assembly and clip.
Figure 26:
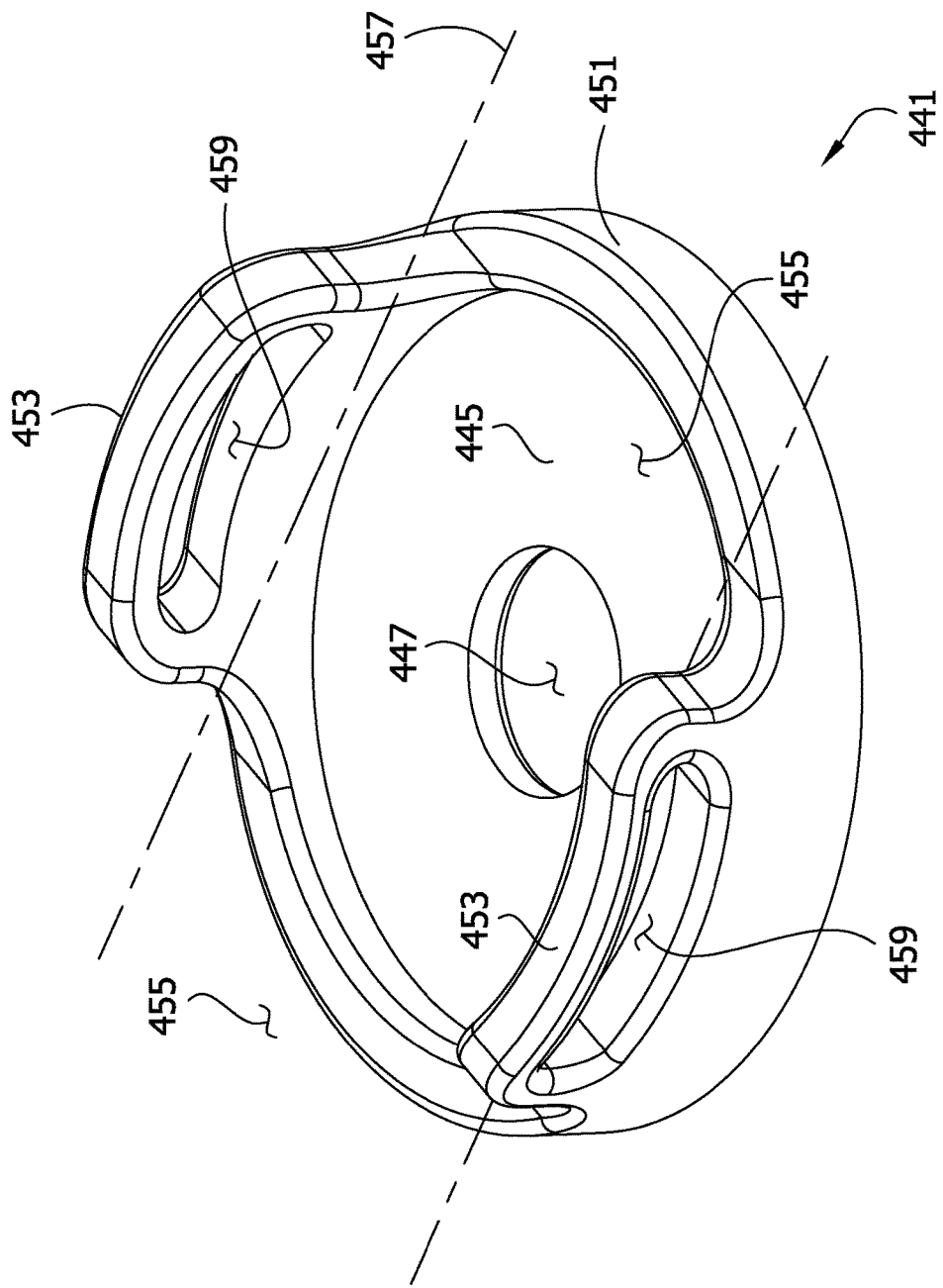
FIG. 26 is a perspective of a rotatable member of the clip of FIG. 24.

The clip 392 includes a rotatable member 441 and a retaining member 443 that can be selectively secured to the rotatable member. Referring to FIG. 26, the rotatable member 441 includes a radially extending base 445 having a mounting aperture 447 extending axially through the base. As shown in FIG. 24, the rotatable member 441 is mounted on the lower housing member 324 so that the stem 394 of the clip securement boss 390 extends through the mounting aperture 447 to permit rotation of the rotatable member about the stem portion against the outer surface 396. In addition, the arcuate shoulders 400 of the head 398 engage the base 445 to prevent the rotatable member 441 from becoming disconnected from the lower housing member 324. Referring again to FIG. 26, an annular loop receiving structure 451 extends axially from the perimeter of the base 445. As shown in FIG. 24, the loop receiving structure 451 has an outward facing surface that is positioned inside the annular side of the housing 320 when the clip 392 is mounted on the housing. When the tether is in the retracted position, a handhold such as the nylon hand hold 230 of FIG. 22 can be looped over the housing 320 to engage the outward facing surface of the loop receiving structure 451 to stow the handhold between the base 350 of the lower housing member 324 and the pet collar.

Two collar-retaining brackets 453 extend axially away from diametrically opposite sides of the base 445. The brackets 453 are spaced to define a collar gap 455 that forms part of a collar passage 457. The collar of a pet extends through the collar passage 457. Each of the brackets 453 has an opening 459. The openings 459 are shaped and arranged to receive the retaining member 443 to secure the pet collar in the collar passage 457 between the retaining member and the base 445 of the rotatable member 441.

Figure 27:
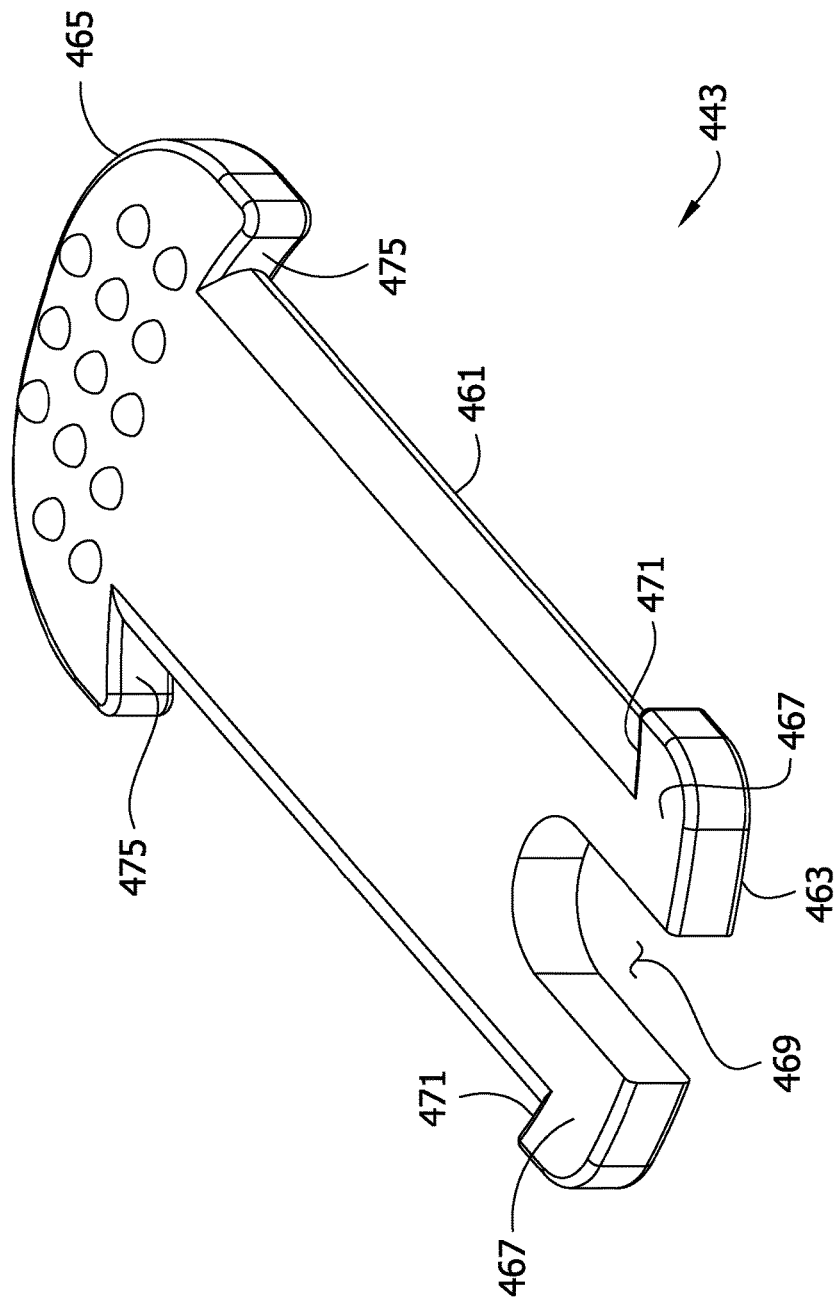
FIG. 27 is a perspective of a retaining member of the clip of FIG. 24

The retaining member 443 is a one-piece body made from a resiliently deformable material (e.g., plastic). Referring to FIG. 27, the retaining member 443 includes an elongate body 461 with an enlarged head portion 463 and enlarged tail portion 465 at opposite longitudinal ends of the body. The head portion 463 defines two outwardly extending flange arms 467 that are laterally spaced apart from one another on opposite sides of a slot 469. Each of the flange arms 467 defines an inwardly facing shoulder 471 with the longitudinal sides of the body 461. The flange arms 467 are configured to resiliently deflect laterally inwardly toward the slot 469 when the retaining member 443 is inserted into the retaining member-receiving apertures 459 in the rotatable member 441. The tail portion 465 also defines inwardly facing shoulders 475 with the longitudinal sides of the body 461 at the opposite end of the spine portion. The body 461 is sized to slidably fit within the retaining member-receiving apertures 459 of the rotatable member 441. When the body 461 is received through both of the retaining member-receiving apertures 459, the shoulder portions 471, 475 lockingly engage the brackets 453 to inhibit the retaining member 443 from sliding out of the rotatable member 441.

As shown in FIG. 24, the rotatable member 441 is mounted on the clip securement boss 390 for rotation relative the housing 320. A pet collar may be positioned in the collar passage 457 so the collar extends through the passage and lies flat against the base 445. The forked end 463 of the retaining member 443 is inserted into the opening 459 in one of the brackets 453. The opposing arms 467 deform inward as they pass through the opening 459. The body 461 slides through the bracket 453 until the forked end 463 engages the opposite bracket where the opposing arms 367 deform inward until they pass through the opening 459. Once the head 463 has passed through both brackets 453, shoulders 471, 475 at the ends of the rams 167 prevent the retaining member 443 from becoming disconnected from the rotatable member 441. The pet collar is secured to the clip 392 between the body 461 of the retaining member 443 and the base 445 of the rotatable member 441.

Referring to FIGS. 28-33, a third example of a retractable pet leash is indicated in its entirety by reference number 510. Features of the leash 510 are numbered similarly to corresponding features of the leash 12 except 500 is added to the reference number. The leash 510 includes a retractor assembly 512 for automatically retracting a flexible tether or lead, generally designated by 514, when tension between the tether and the retractor assembly is released. In use, the retractor assembly 512 is secured to the collar of a pet so the weight of the retractor assembly is supported by the pet. One end of the flexible tether 514 is secured to the retractor assembly 512, and the other end of the tether is secured to a handhold or grip 515.

The retractor assembly 512 includes a housing, generally designated by 520, consisting of an upper housing member 522 and a lower housing member 524. As with the housing members 22, 24 of the first example the housing members 522, 524 of the third example are separate plastic components manufactured by an injection molding process. As shown in FIGS. 30-33, a clip or fastener 592 is connected to the lower housing member 524. As will be described in further detail below, the fastener 592 joins the housing members 522, 524 to form the inseparable housing 520 having an internal chamber 526. The fastener 592 freely rotates with respect to the housing 522 to prevent the tether 514 from binding as discussed previously.

Figure 28:
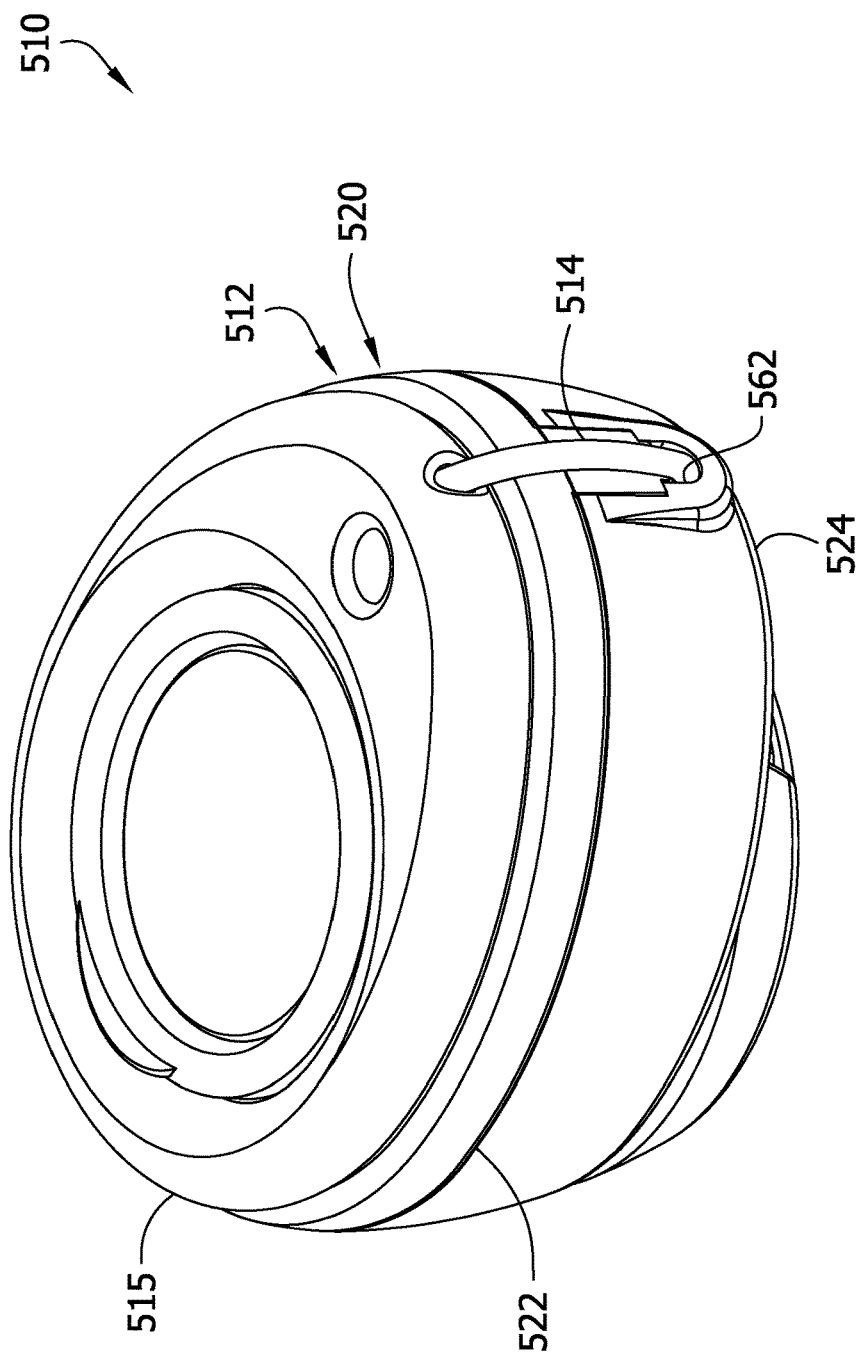
FIG. 28 is a perspective of a retractable pet leash of a third example.
Figure 34:
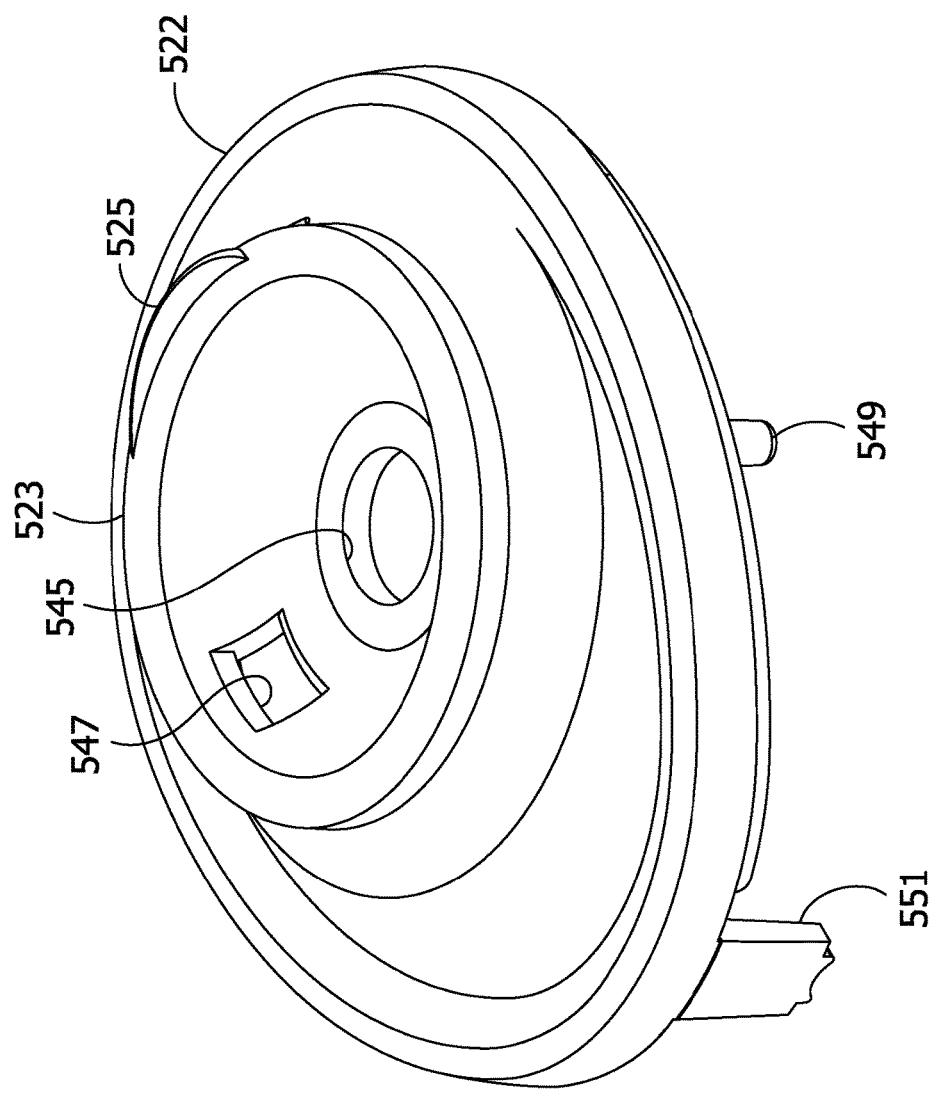
FIG. 34 is a perspective of an upper housing member of the retractor assembly of FIG. 28.
Figure 35:
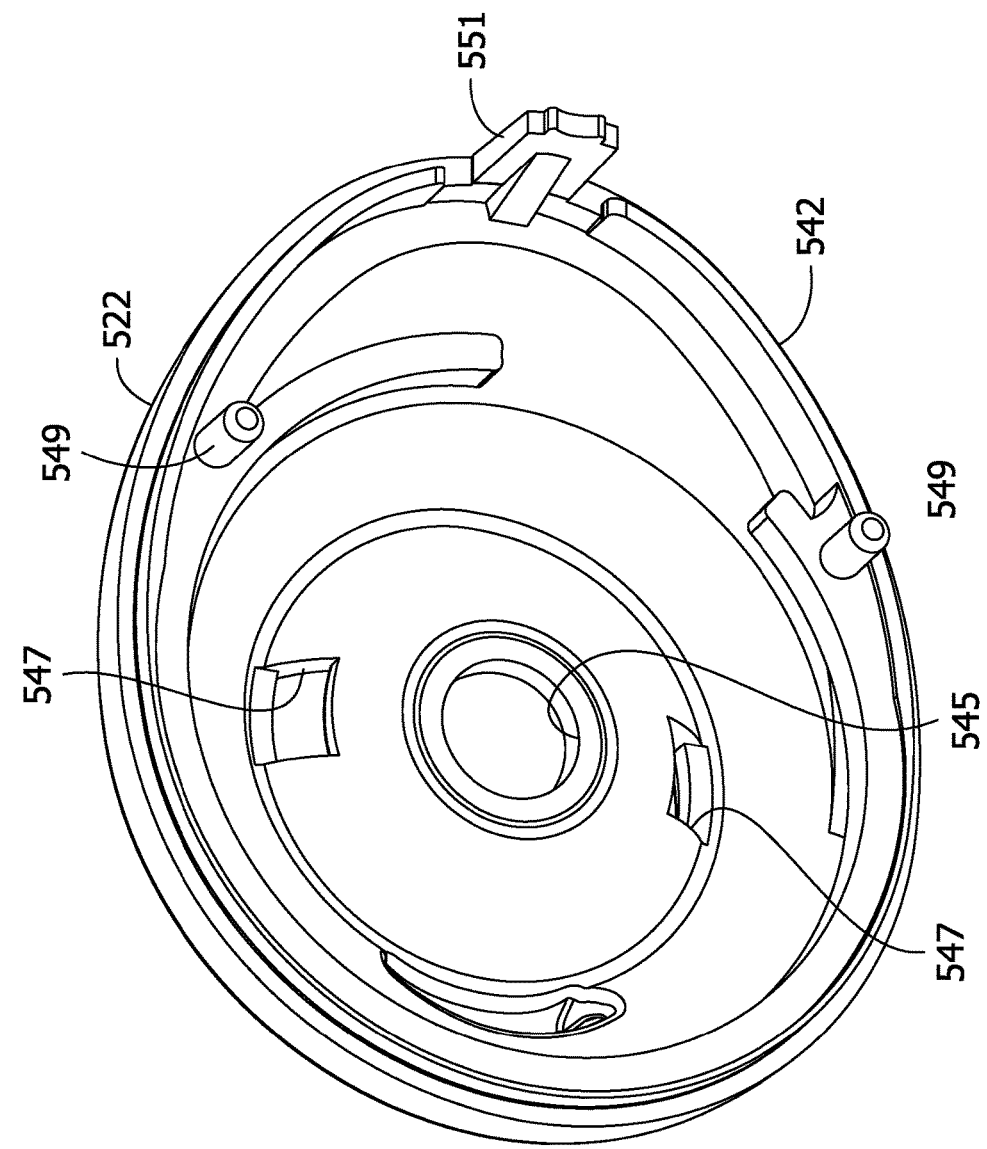
FIG. 35 an alternate perspective of the upper housing member of FIG. 34.

As shown in FIGS. 34 and 35, the upper housing member 522 is generally teardrop shaped and has a central protrusion 523 sized to engage the handhold 515 when in a stowed position as shown in FIG. 28. The protrusion 523 includes a lip 525 that retains the handhold 515 in the stowed position. The upper housing member 522 also has a central opening 545 for receiving the fastener 592 as will be explained below. The upper member 522 also includes a rectangular opening 547 on opposite sides of the central opening 545. Alignment pins 549 are provided adjacent opposite sides of the upper member 522 for angularly aligning the upper member 522 with the lower member 524. Further, a spacer 551 extends from a lower edge of an annular side 542 of the upper member 522 for aligning the tether 514 with a spool 530 as will be described below.

Figure 29:
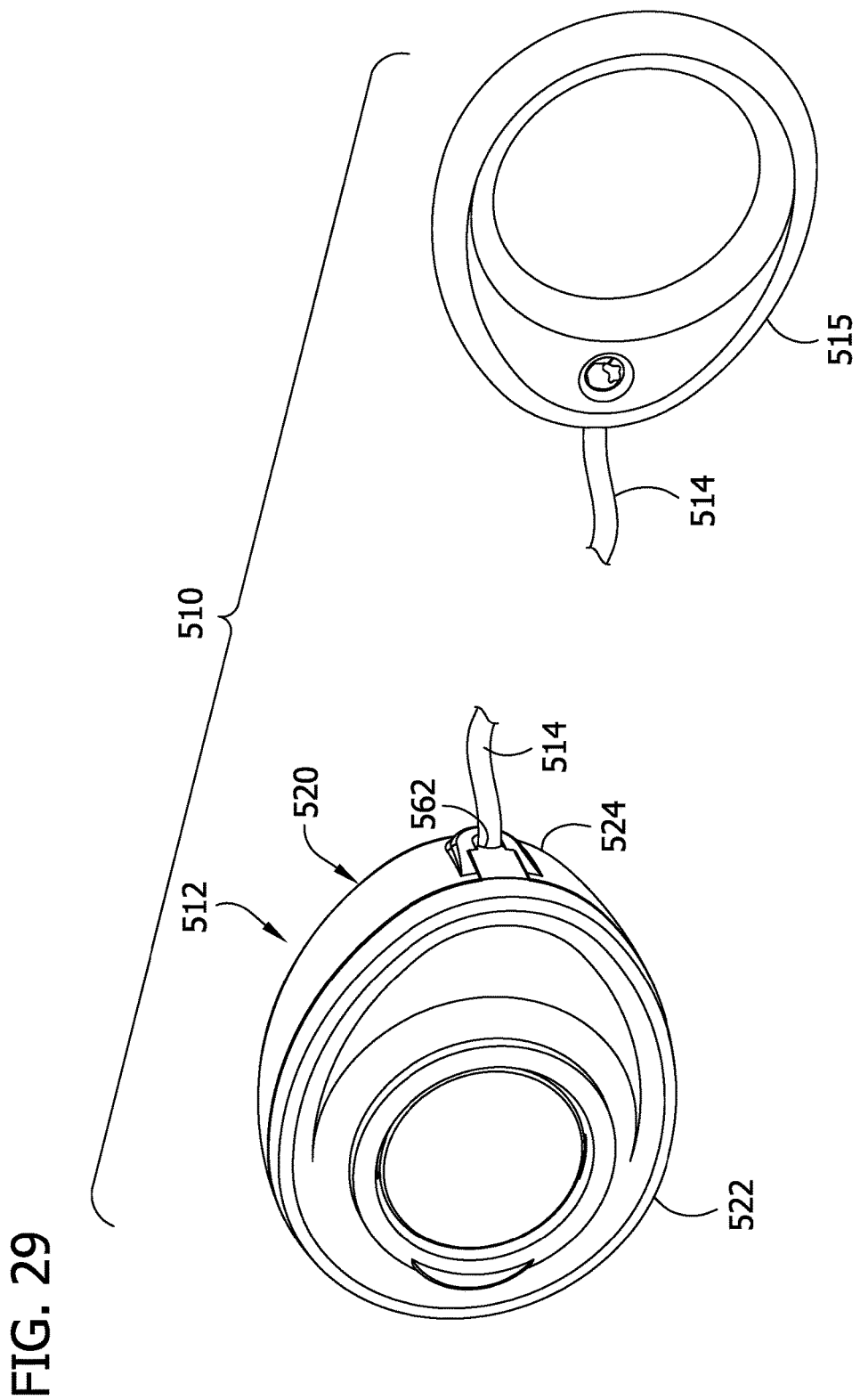
FIG. 29 is a perspective similar to FIG. 8 but having its handle detached from its housing.
Figure 30:
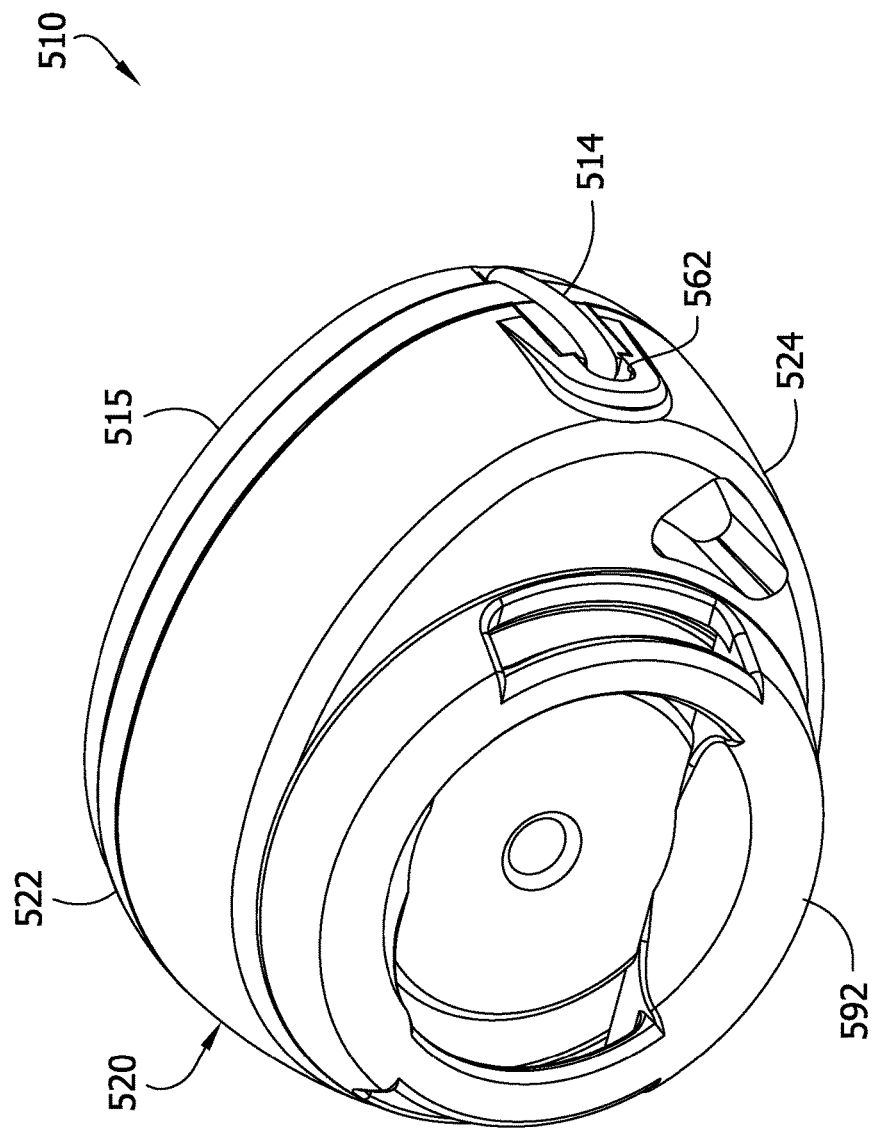
FIG. 30 is an alternate perspective of the leash of FIG. 28.
Figure 31:
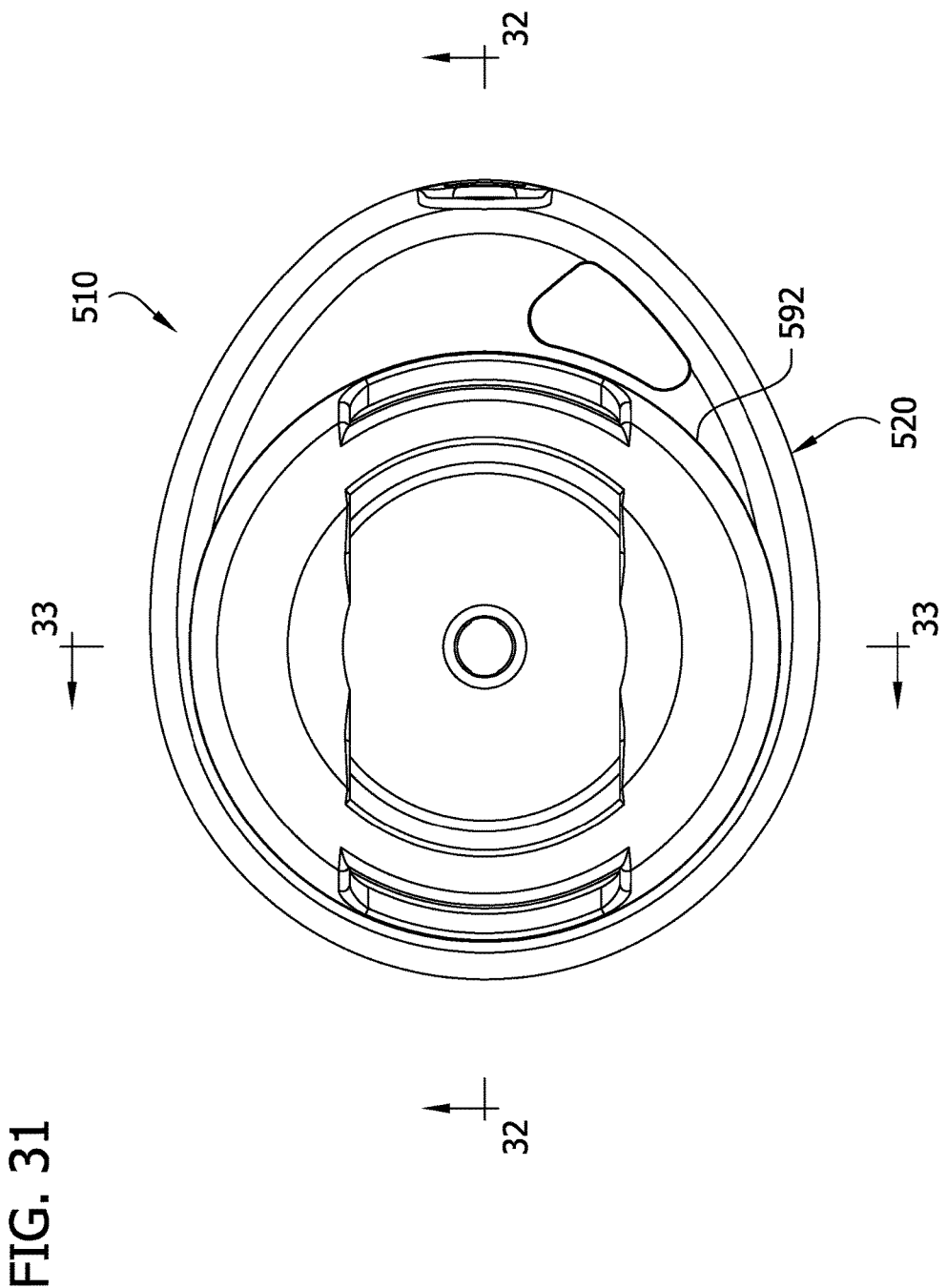
FIG. 31 is a bottom plan of the leash of FIG. 28.
Figure 36:
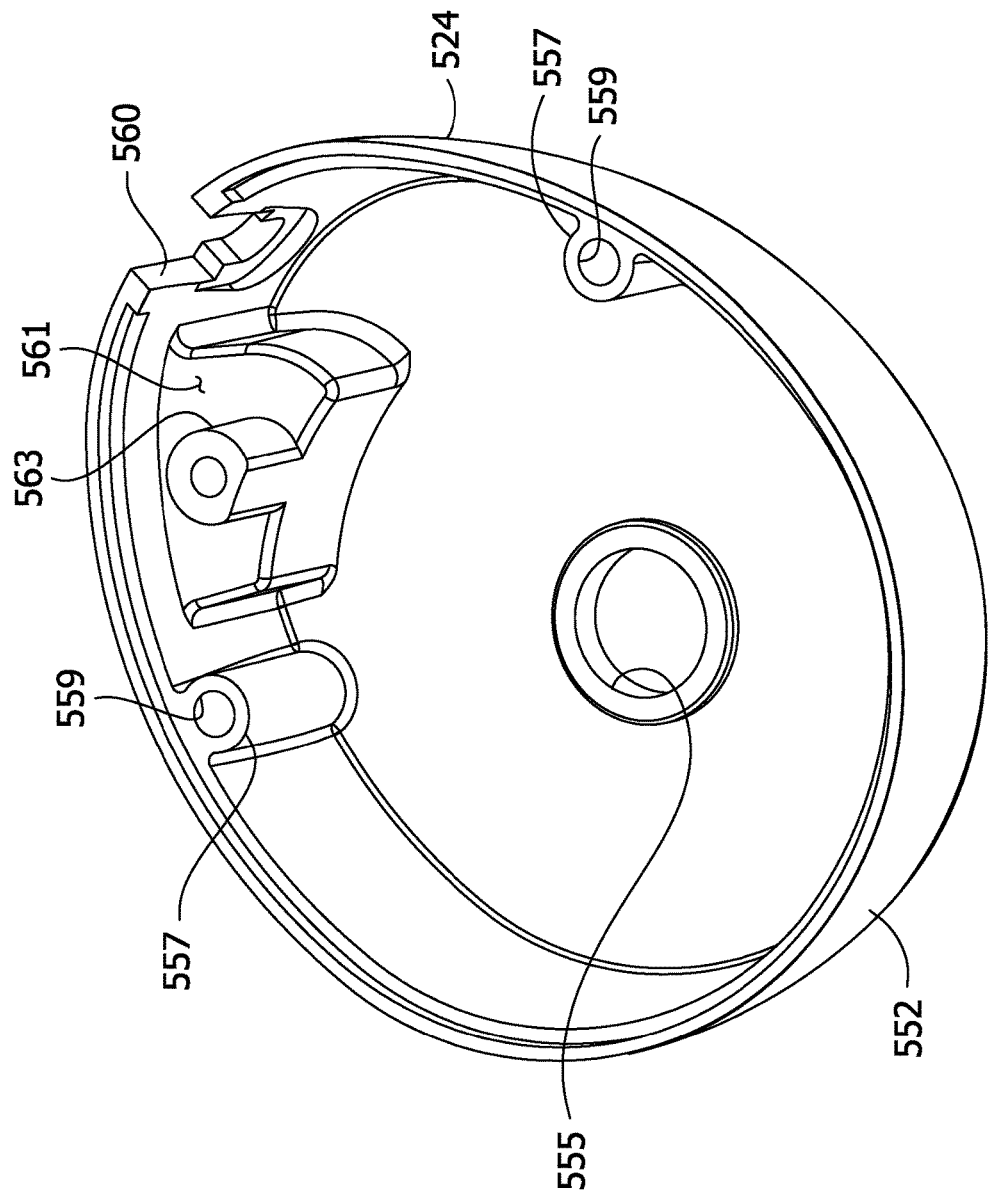
FIG. 36 is a perspective of a lower housing member of the retractor assembly of FIG. 28.
Figure 37:
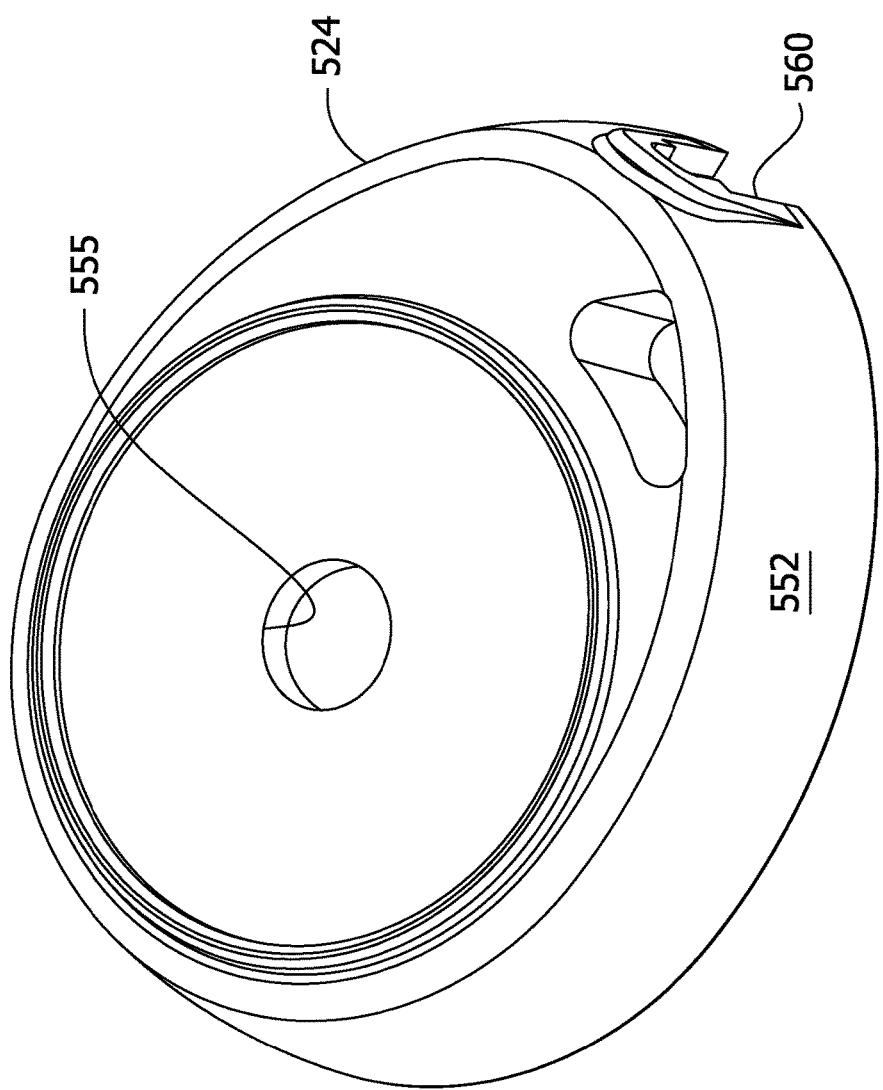
FIG. 37 an alternate perspective of the lower housing member of FIG. 36.

Referring to FIGS. 36 and 37, the lower housing member 524 is also teardrop shaped and has a central opening 555 for receiving the fastener 592. As illustrated in FIG. 36, tubular bosses 557 having central openings 559 are provided on opposite sides of the lower member 524 for receiving the alignment pins 549 of the upper member 522. A side 552 of the lower housing 524 includes a slot 560. When the upper and lower housing members 522, 524, respectively, are joined, the slot 560 receives the spacer 551 of the upper housing member 522, forming a tether guide opening 562 (FIGS. 28-30). In use, the tether 514 extends through the tether opening 652. A raised land 561 protrudes into the interior of the lower housing member 524 adjacent the slot 560. A spring keeper 559 protrudes from the land 561 for holding a spring 557 as will be described below. As shown in FIG. 37, a lower face of the lower member 524 includes a circular ridge 563 surrounding the central opening 555 for receiving the fastener 592.

Figure 38:
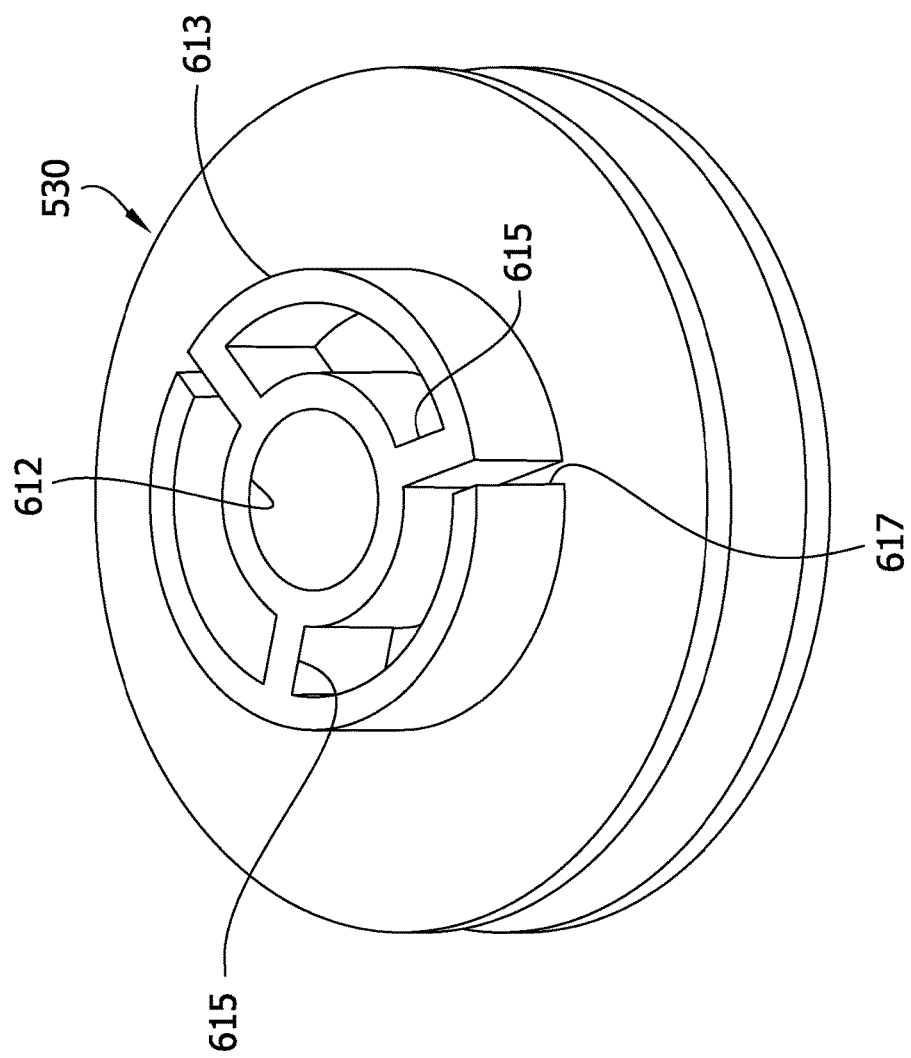
FIG. 38 is a perspective of a spool of the retractor assembly of FIG. 28.
Figure 39:
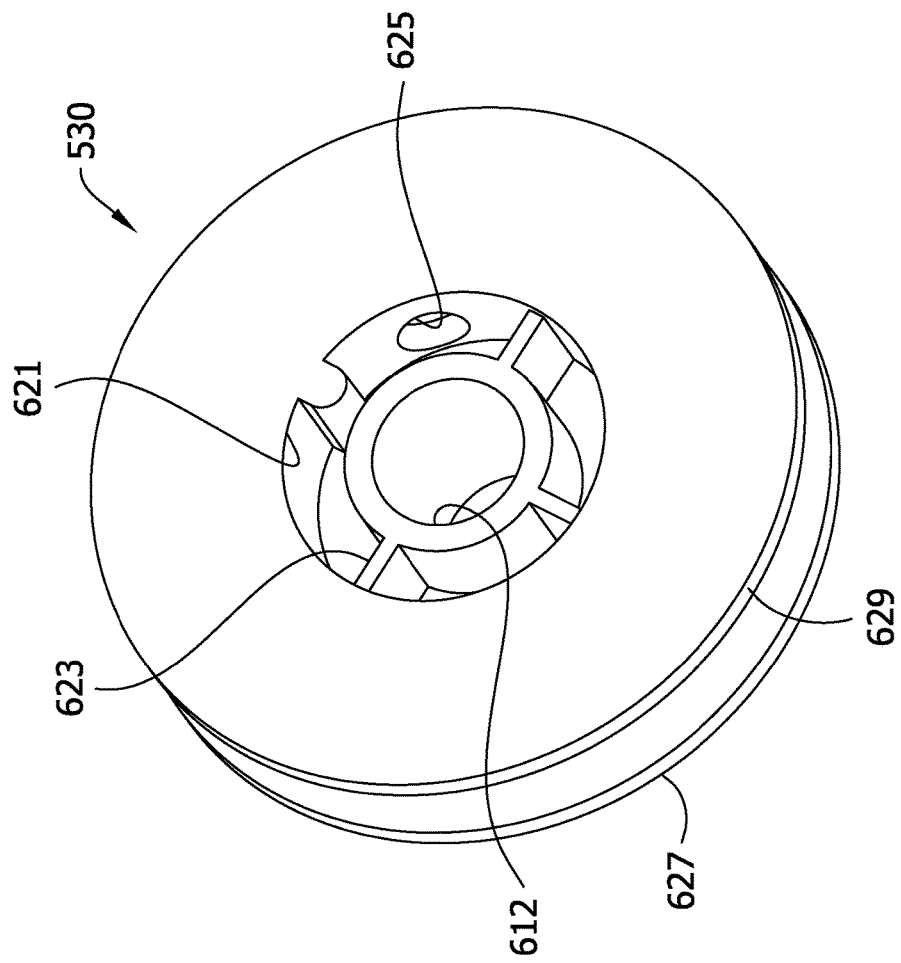
FIG. 39 an alternate perspective of the spool of FIG. 38.
Figure 40:
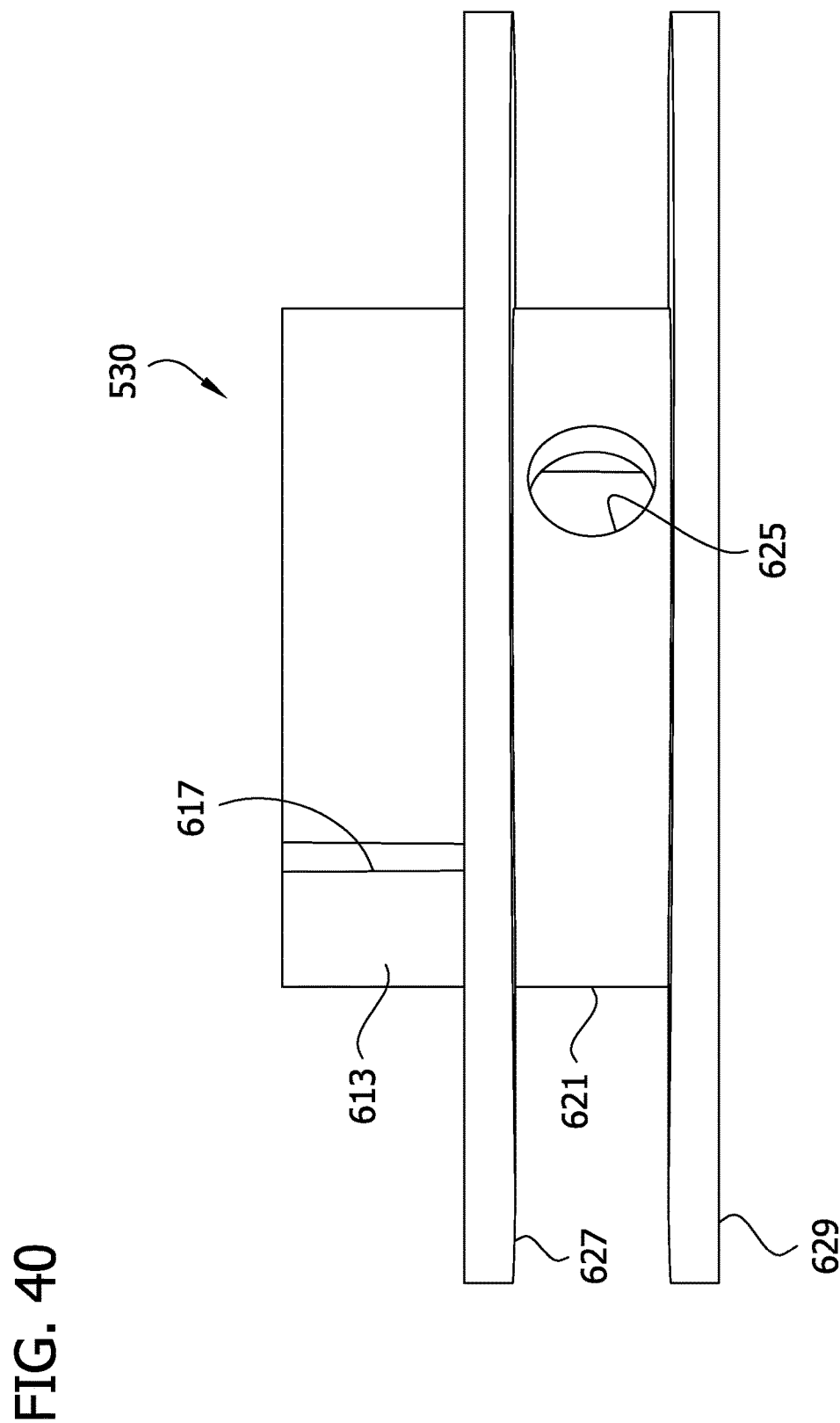
FIG. 40 a side elevation of the spool of FIG. 38.

As illustrated in FIGS. 38-40, the tether spool 530 has a central bore 612 which rotatably receives the fastener 592 during assembly. As shown in FIG. 38, the tether spool 530 has a generally tubular projection 613 surrounding the central bore 612 adjacent its upper end. In the illustrated example, braces 615 connect the central bore 612 and tubular projection 613. A slot 617 is provided in the tubular projection 613 for receiving an end of the spring 557 as will be described below. As shown in FIG. 39, a circular wall 621 surrounds the central bore 612 adjacent its lower end. In the illustrated example, braces 623 connect the central bore 612 to the circular wall 621. A hole 625 is formed in the circular wall 621 for receiving an end of the tether as will be explained below. Further, a separator flange 627 is positioned between the tubular projection 613 and the circular wall 621. As will be appreciated by those skilled in the art, the separator flange 627 separates the spring 557 and the tether 514. A base flange 629 is provided on the circular wall 621 opposite the separator flange 627 to keep the tether 514 on the spool 630.

Figure 41:
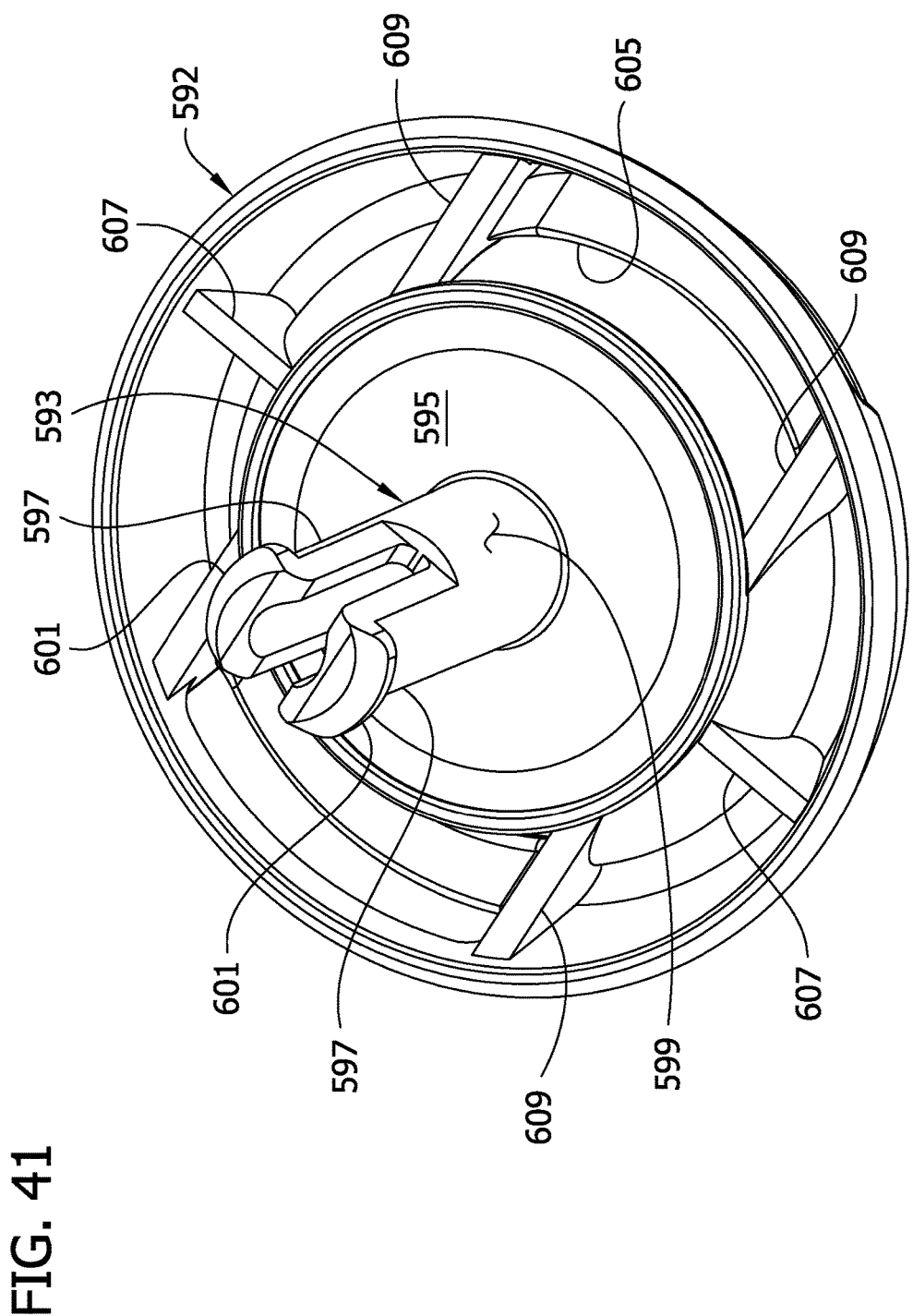
FIG. 41 is a perspective of a clip of the retractor assembly of FIG. 28.
Figure 42:
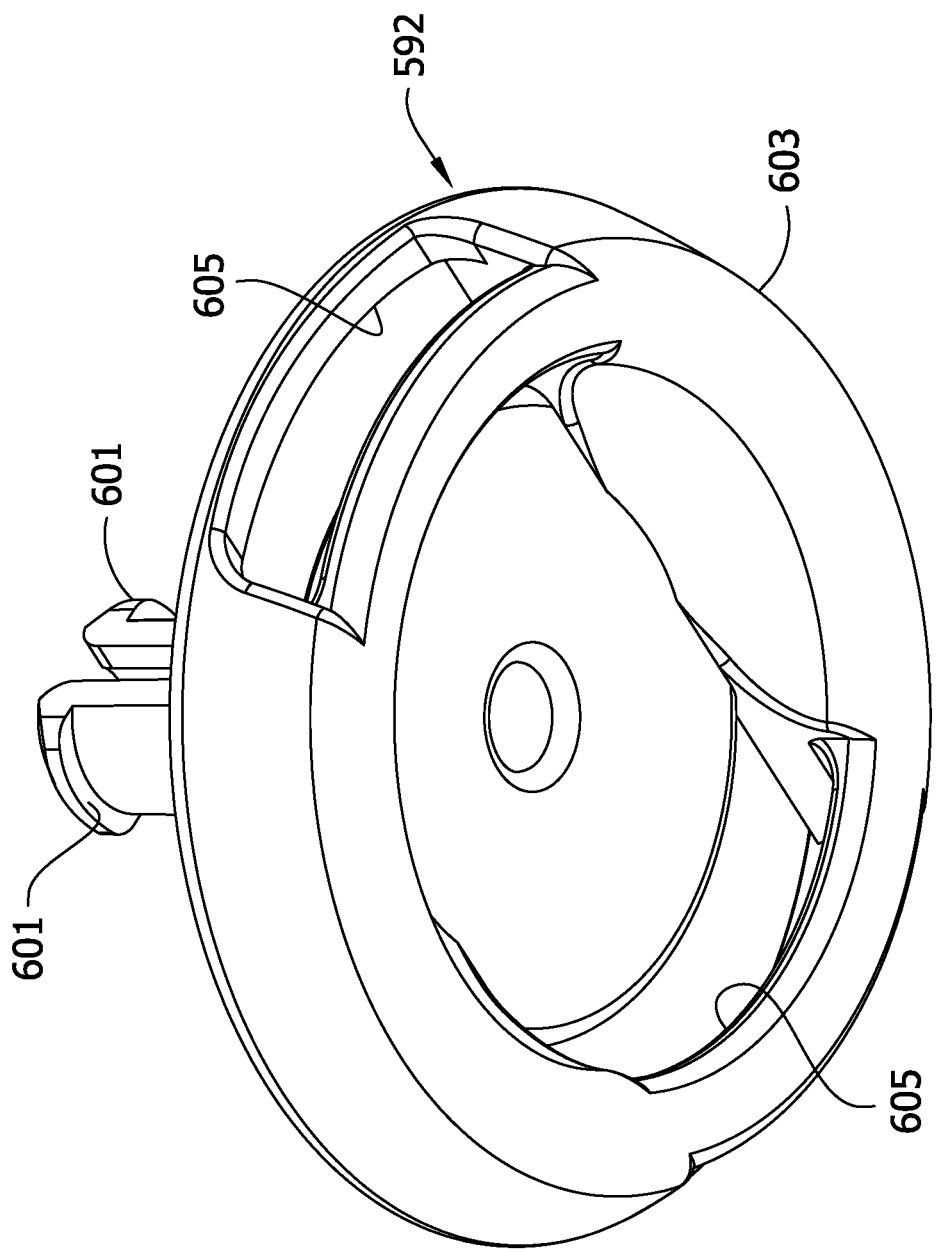
FIG. 42 an alternate perspective of the clip of FIG. 41.

FIGS. 41 and 42 illustrate the fastener 592. As shown in FIG. 41, a forked pin 593 extends from an upper face 595 of the fastener 592. The pin 593 includes spaced arms 597 at an end opposite the upper face 595 and a bearing surface 599 at an end adjacent the upper face of the fastener 592. Each arm 597 includes an outward facing hook 601. As shown in FIG. 42, a semi-toroidal surface 603 surrounds the fastener 592. Four rectangular collar retention openings 605 are provided in the semi-toroidal surface. A pet collar may be threaded through these openings 605 to attach the pet leash 510 to a pet collar (not shown). As further shown in FIG. 41, braces 607 are provided on the fastener 592 for reinforcing the semi-toroidal surface 603. Guide walls 609 are provided at opposite ends of the rectangular collar retention openings 605 for guiding the collar as it is threaded through the openings.

Figure 43:
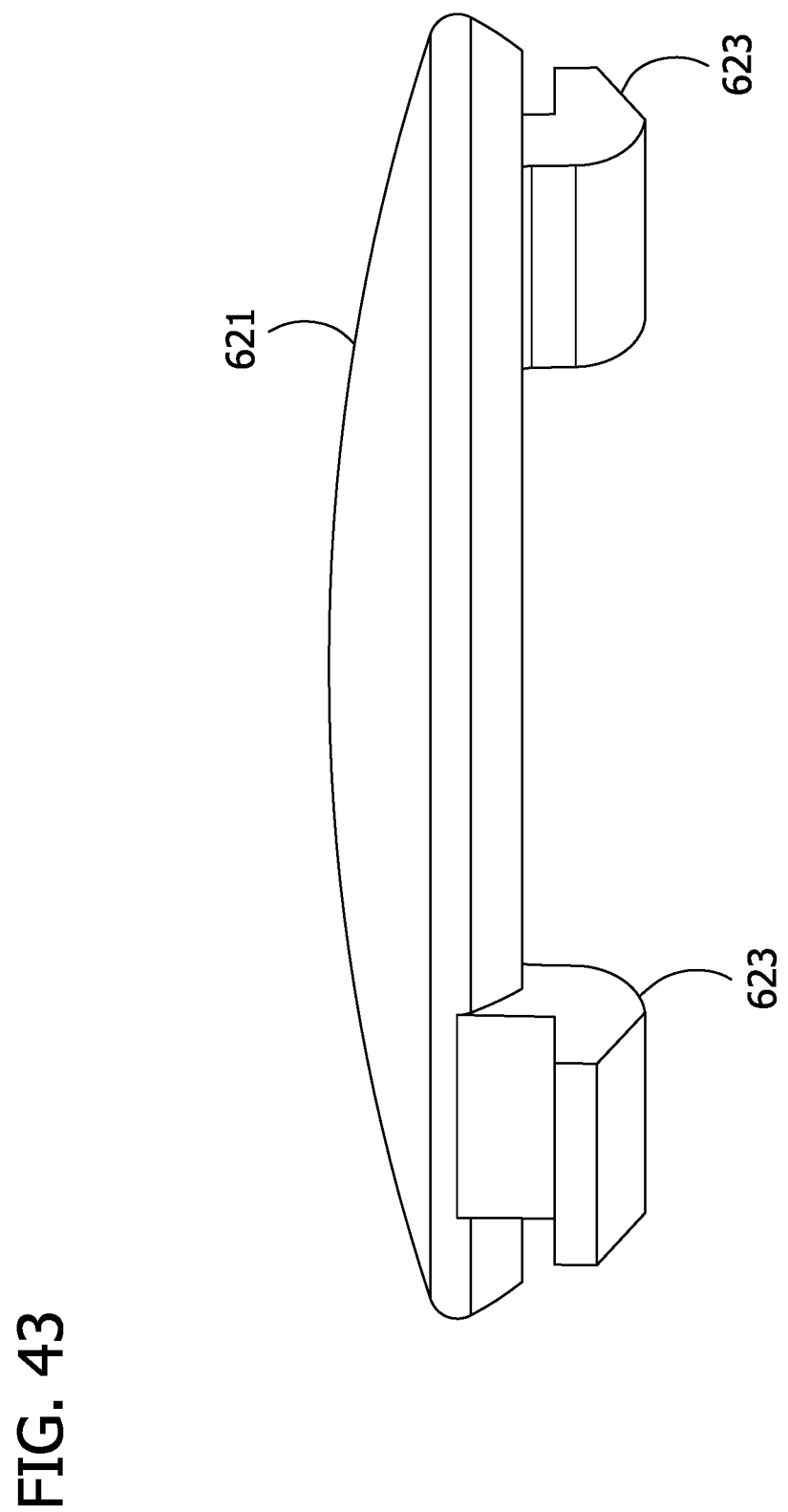
FIG. 43 a side elevation of a cap of the retractor assembly of FIG. 28.

A dome-shaped cap or cover 621 is illustrated in FIG. 43. The cap 621 has opposite facing hooks 623 that fit the rectangular openings 547 in the upper member 522 during assembly of the leash 510.

Figure 44:
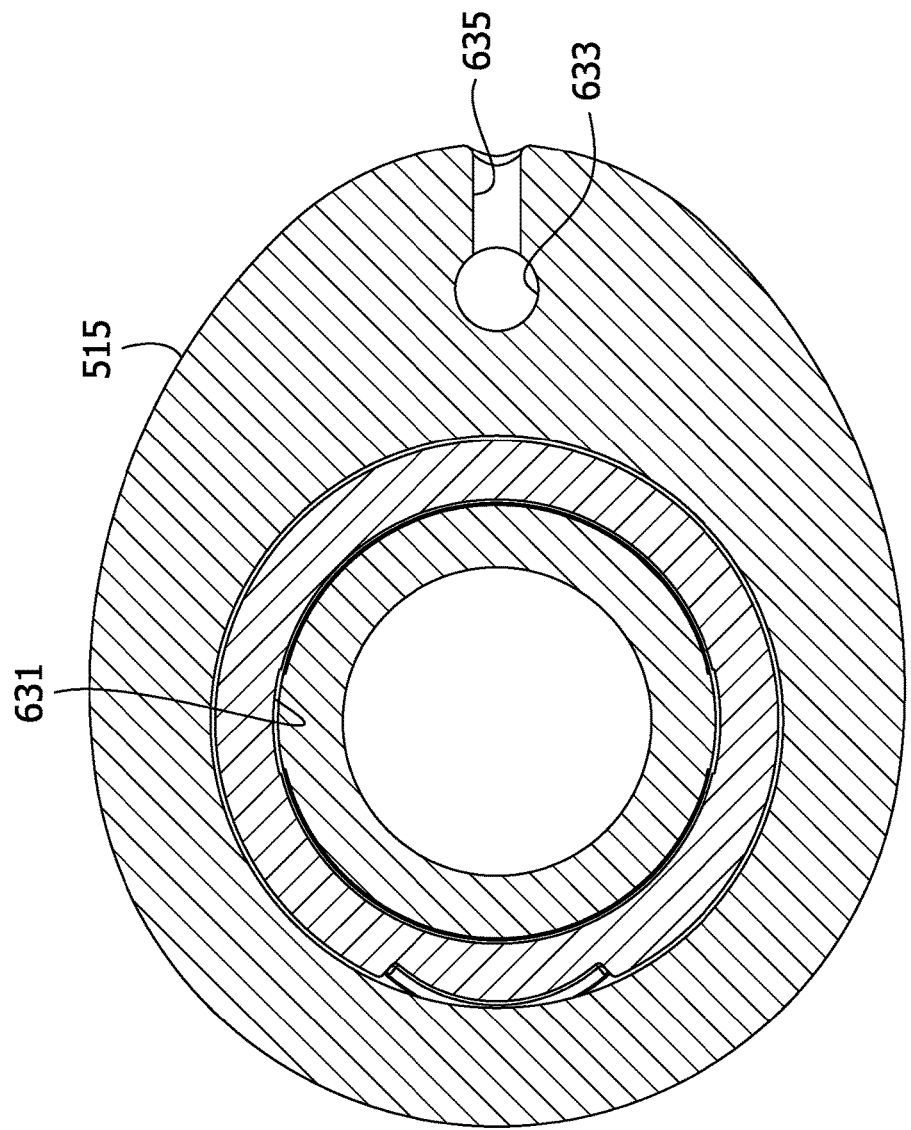
FIG. 44 is a cross section of the handle taken in the plane of line 44-44 of FIG. 32.

FIG. 44 illustrates a cross section of the handhold or grip 515. The grip 515 is generally teardrop shaped and has a central opening 631 for receiving a user's hand when the grip is deployed for use. A hole 633 extends through the grip 615 beside the central opening 631. An opening 635 extends inward from one end of the grip 515 to the hole 633 for attaching the tether 514 to the grip.

Figure 32:
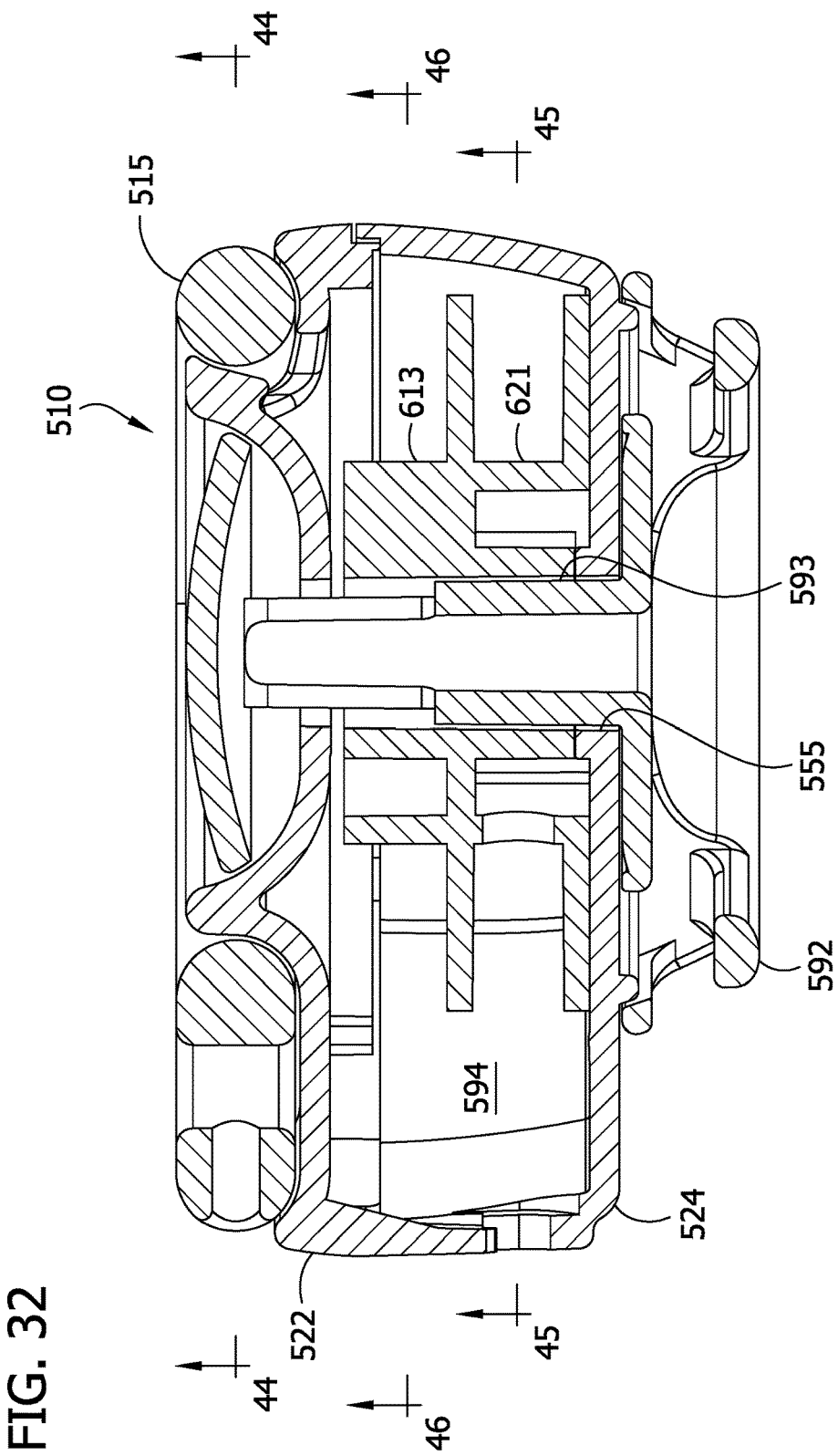
FIG. 32 is a cross section taken in the plane of line 32-32 of FIG. 31.
Figure 33:
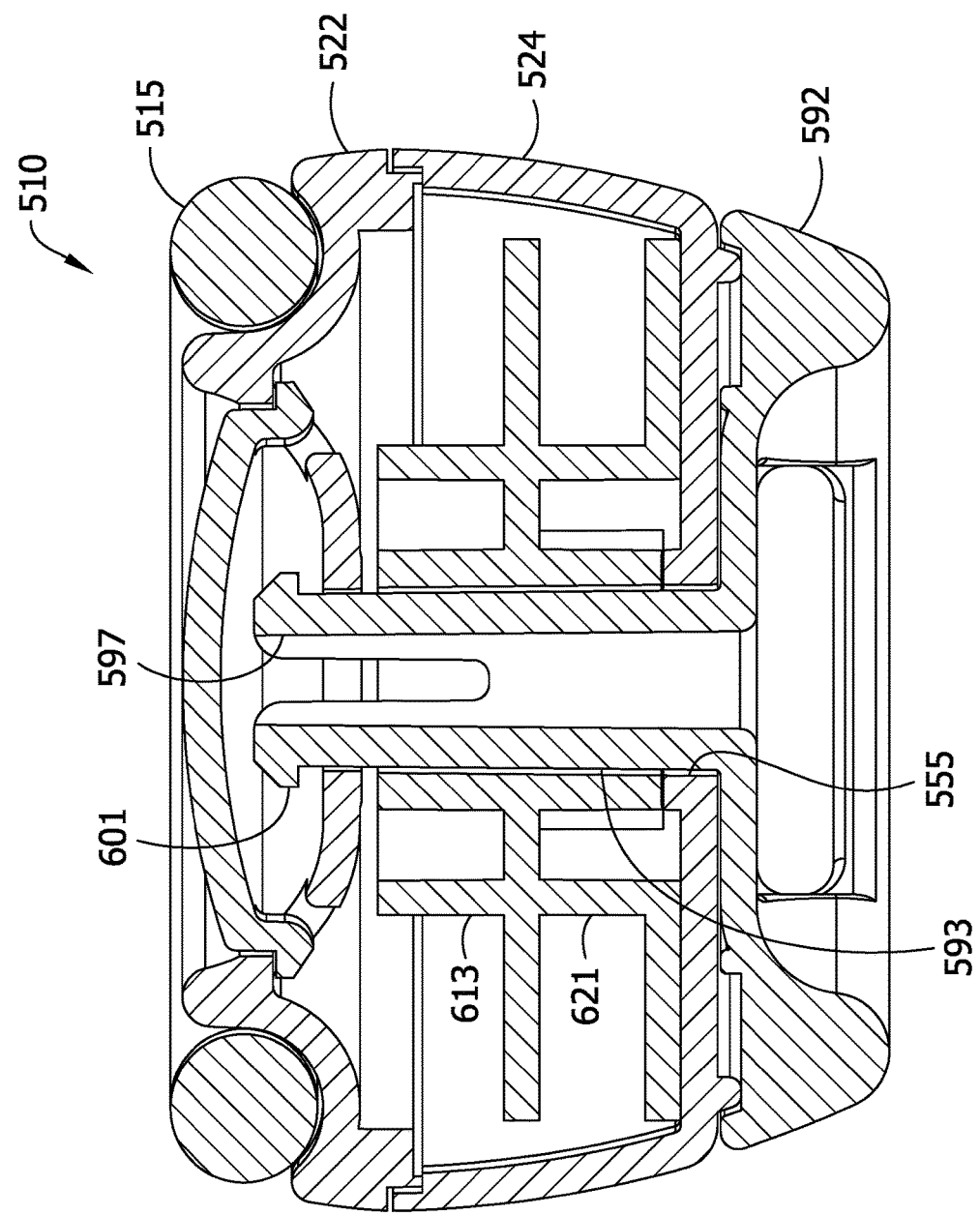
FIG. 33 is a cross section taken in the plane of line 33-33 of FIG. 31.
Figure 45:
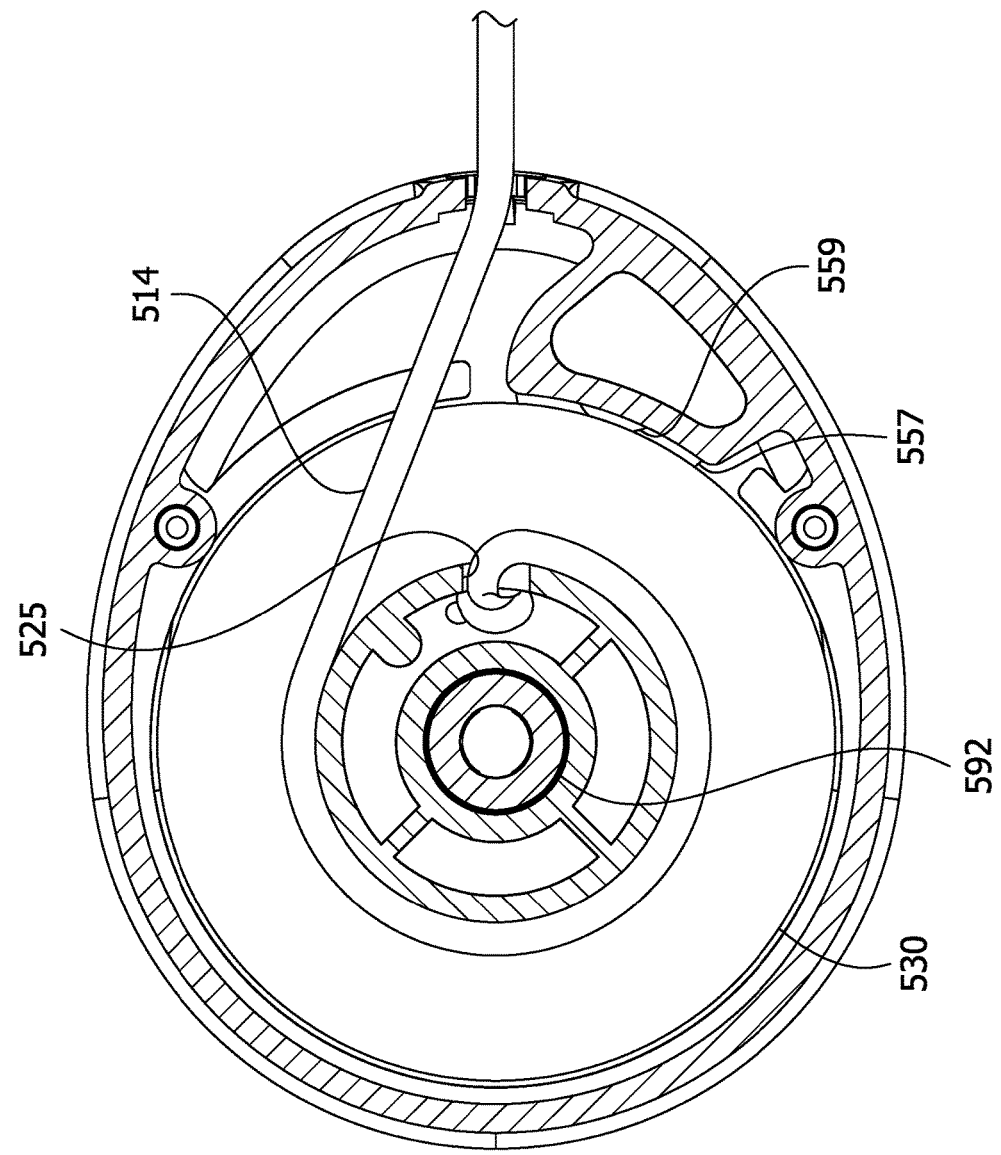
FIG. 45 is a cross section of the handle taken in the plane of line 45-45 of FIG. 32.
Figure 46:
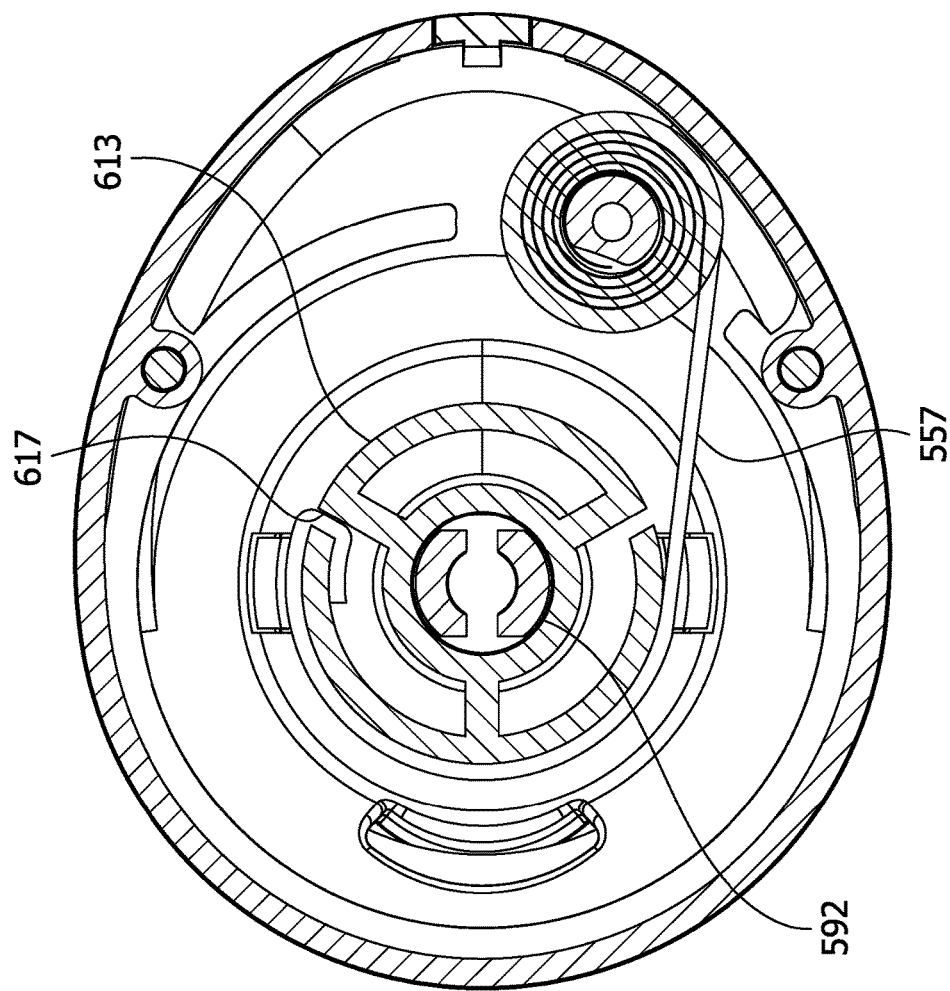
FIG. 46 is a cross section of the handle taken in the plane of line 46-46 of FIG. 32.

To assemble the retractable leash 510, a tether 514 is threaded through the opening 635 of a grip 515 and knotted as shown in FIG. 29, and a spring 557 is positioned on the spring keeper 559 of a lower housing member 524 as shown in FIG. 45. The spring 557 should be oriented so it unwinds in the direction shown in FIG. 46. An end of the tether 514 opposite the grip 515 is threaded through the hole 625 formed in the circular wall 621 of the tether spool 530 and knotted. The tether 514 is partially wound onto the outer surface of the wall 621 of the spool 530 between the separator flange 627 and the base flange 629. The tether 514 is wound on the spool 530 in the direction shown in FIG. 45. A fastener 592 is inserted through the central opening 555 of the lower housing member 524 and the spool is mounted on the lower housing member 524 as shown in FIGS. 32, 33, and 45. With the tether 514 partially wound around the spool 530 as described above, a hooked end of the spring 557 is inserted into the slot 617 in the tubular projection 613 of the spool as shown in FIG. 46. The upper housing member 522 positioned on the pin 593 of the fastener 592 as shown in FIGS. 32 and 33 so the alignment pins 549 on the upper member engage the central openings 559 in the tubular bosses 561 of the lower member 524. As will be appreciated by those skilled in the art, the arms 597 deflect inward as the fastener 592 enters the central opening 545 of the upper housing member 522 and return to their undeformed positions to engage the hooks 601 at the ends of the arms with the upper housing member to connect the upper housing member to the lower housing member 524. The hooks 623 of the domed cap 621 are inserted in the rectangular openings 547 of the upper member 522 to cover the ends of the forked fastener pin 593 to prevent inadvertent housing disassembly. The leash assembly 510 is complete.

To use the leash, a pet collar is threaded through the collar retention openings 605 provided in the fastener 592, and the collar is fastened to the pet in a conventional fashion. The pet carries the leash 510. When desired, the user disengages the grip 515 from the central protrusion 523 of the upper member 522 and pulls on the grip to deploy the tether 514. When ready to stow the grip 515 the user reinstalls the grip on the central protrusion 523. The spring 557 retracts the tether 514 into the internal chamber 526 of the housing 520 as the user moves the grip 515 toward the tether assembly 512.

When introducing elements of the present invention or examples(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above apparatuses, systems, and methods without departing from the scope of the invention, it is intended that all matter contained in the above description and shown in the accompanying drawings shall be interpreted as illustrative and not in a limiting sense.

What is claimed is:

1. A retractable pet leash comprising:
a grip configured for releasably attaching to a user;
a flexible tether connected to the grip; and
a retractor assembly including a housing having an internal chamber sized and shaped for receiving a spool for receiving the tether thereon when retracted into the housing and a fastener rotatably attached to the housing, said fastener being adapted to attach the housing to a pet garment so the housing rotates with respect to the fastener.

2. A retractable pet leash as set forth in claim 1, wherein:
the fastener includes a pin; and
the housing includes an opening sized for rotatably receiving the pin so the housing rotates with respect to the fastener.

3. A retractable pet leash as set forth in claim 2, wherein the pin is a forked pin having spaced resilient arms adapted to deflect inwardly as the pin is received in the opening of the housing and return to an undeflected configuration after passing through the opening.

4. A retractable pet leash as set forth in claim 3, wherein each of said arms includes a hooked end configured for engaging the housing to prevent the pin from being removed from the opening once the arms return to the undeflected configuration.

5. A retractable pet leash as set forth in claim 2, wherein the housing comprises:
an upper housing member having an opening sized for rotatably receiving the pin; and
a lower housing member having an opening sized for rotatably receiving the pin, the lower housing member being configured to mount on the upper housing member so the upper housing member and the lower housing member rotate as a unit with respect to the fastener when the pin is received in both the opening of the upper housing member and the opening of the lower housing member.

6. A retractable pet leash as set forth in claim 2, wherein the spool has a central bore sized for rotatably receiving the pin.

7. A retractable pet leash as set forth in claim 1, wherein the fastener is adapted to attach the housing to a pet collar.

8. A retractable pet leash as set forth in claim 7, wherein the fastener has a collar retention opening sized for receiving a pet collar to attach the housing to the pet collar.

9. A retractable pet leash comprising:
a grip having an opening sized for attaching to a user;
a flexible tether connected to the grip; and
a retractor assembly including a housing having an internal chamber sized and shaped for receiving a spool for receiving the tether thereon when retracted into the housing and a fastener attached to the housing adapted for attaching the housing to a pet garment, said housing having a protrusion configured for engaging the opening in the grip to secure the grip to the housing in a stowed position.

10. A retractable pet leash as set forth in claim 9, wherein the housing includes a lip shaped and positioned for engaging the grip when the housing protrusion engages the opening of the grip to releasably retain the grip on the protrusion in the stowed position.

11. A retractable pet leash as set forth in claim 10, wherein the lip extends from the protrusion of the housing.

12. A retractable pet leash comprising:
a grip configured for releasably attaching to a user;
a flexible tether connected to the grip; and
a retractor assembly including a housing having an internal chamber and a tether guide opening extending into the internal chamber of the housing, said tether guide opening being sized for slidably passing the tether through when the tether is retracted into the internal chamber of the housing through the tether guard opening;
a spool mounted in the internal chamber of the housing for rotation with respect to the housing about a central axis, said spool having opposite ends spaced along the central axis and a separator flange positioned between the opposite ends of the spool, a first portion of the spool between a first end of said opposite ends of the spool and the separator flange being aligned with the tether guide opening of the housing for windingly receiving the tether when retracted into the internal chamber of the housing; and
a spring positioned in the internal chamber of the housing and being adapted to rotate the spool to wind the tether onto the first portion of the spool, said spring being connected to a second portion of the spool between a second end of said opposite ends of the spool and the separator flange so the separator flange separates the spring from the tether.

13. A retractable pet leash as set forth in claim 12, wherein the spool includes a base flange at the first end of the spool spaced from the separator flange so the base flange and the separator flange define opposite ends of the first portion of the spool, the tether wrapping around the spool between the base flange and the separator flange when wound on the spool.

14. A retractable pet leash as set forth in claim 12, wherein the spool has a central bore and a circular wall surrounding the central bore and extending between the separator flange and said first end of the spool, the tether being wound on the circular wall when retracted into the housing.

15. A retractable pet leash as set forth in claim 14, wherein the circular wall has a through hole that receives an end of the tether to connect the tether to the spool.

16. A retractable pet leash as set forth in claim 15, wherein the end of the tether received by the through hole is knotted to connect the tether to the spool.

17. A retractable pet leash as set forth in claim 14, wherein the spool has a central bore and a tubular projection surrounding the central bore extending between the separator flange and said second end of the spool, the spring being wound on the tubular projection as the tether is unwound from the spool.

18. A retractable pet leash as set forth in claim 12, in the spool has a central bore and a tubular projection surrounding the central bore extending between the separator flange and said second end of the spool, the spring being wound on the tubular projection as the tether is unwound from the spool.

19. A retractable pet leash as set forth in claim 18, wherein the tubular projection has a slot that receives an end of the spring to connect the spring to the spool.

20. A retractable pet leash as set forth in claim 19, wherein housing includes a spring keeper offset from the central bore of the spool, the spring winding around the spring keeper as the tether winds around the spool.

* * * * *